US009257901B2

(12) United States Patent
Sugita et al.

(10) Patent No.: US 9,257,901 B2
(45) Date of Patent: Feb. 9, 2016

(54) DC POWER SUPPLY CIRCUIT

(71) Applicant: Panasonic Corporation, Osaka (JP)

(72) Inventors: Kazushige Sugita, Hyogo (JP);
Kazuhiko Itoh, Osaka (JP); Masanobu Murakami, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/376,984

(22) PCT Filed: Oct. 18, 2012

(86) PCT No.: PCT/JP2012/006656
§ 371 (c)(1),
(2) Date: Aug. 6, 2014

(87) PCT Pub. No.: WO2013/124921
PCT Pub. Date: Aug. 29, 2013

(65) Prior Publication Data
US 2015/0009728 A1    Jan. 8, 2015

(30) Foreign Application Priority Data

Feb. 21, 2012  (JP) ................................ 2012-034804
Mar. 9, 2012  (JP) ................................ 2012-052588

(51) Int. Cl.
*H02J 3/12* (2006.01)
*G05F 1/00* (2006.01)
(Continued)

(52) U.S. Cl.
CPC *H02M 1/42* (2013.01); *H02M 1/14* (2013.01); *H02M 3/1563* (2013.01); *H02M 7/06* (2013.01); *H02M 7/217* (2013.01); *H05B 33/0815* (2013.01)

(58) Field of Classification Search
USPC ............... 323/242, 288; 363/56.12, 67, 68
See application file for complete search history.

(56) References Cited

U.S. PATENT DOCUMENTS 5,740,022 A    4/1998  Abe
6,115,273 A    9/2000  Geissler
(Continued)

FOREIGN PATENT DOCUMENTS

DE    196 33 351 A1    2/1997
EP    2 458 722 A1    5/2012
(Continued)

OTHER PUBLICATIONS

Extended European Search Report for corresponding European Application No. EP 12 86 9175 dated Feb. 27, 2015 (previously submitted on IDS filed May 26, 2015).
(Continued)

*Primary Examiner* — Adolf Berhane
*Assistant Examiner* — Gary Nash
(74) *Attorney, Agent, or Firm* — Renner, Otto, Boisselle & Sklar, LLP

(57) ABSTRACT

In a DC power supply circuit, a first period and a second period are alternately repeated a plurality of times during each half cycle of AC supplied to the DC power supply circuit. The first period is a period during which current flows along a first current path extending from an output terminal at a high-potential side of a rectifier circuit to an output terminal at a low-potential side of the rectifier circuit, via an inductor and a switching element. The second period is a period during which current flows along a second current path extending from the output terminal at the high-potential side of the rectifier circuit to the output terminal at the low-potential side of the rectifier circuit, via the inductor, a charging current supply path, and a capacitor.

12 Claims, 28 Drawing Sheets

(51) Int. Cl.
  *H02H 7/122* (2006.01)
  *H02M 7/10* (2006.01)
  *H02M 1/42* (2007.01)
  *H02M 3/156* (2006.01)
  *H02M 1/14* (2006.01)
  *H02M 7/06* (2006.01)
  *H02M 7/217* (2006.01)
  *H05B 33/08* (2006.01)

(56) References Cited

U.S. PATENT DOCUMENTS

| | | | |
|---|---|---|---|
| 6,266,257 | B1 | 7/2001 | Geissler |
| 6,865,096 | B1 | 3/2005 | Geissler |
| 2001/0026458 | A1 | 10/2001 | Geissler |
| 2002/0191425 | A1 | 12/2002 | Geissler |
| 2004/0125625 | A1* | 7/2004 | Nillesen ............ H02M 7/2176 363/125 |
| 2005/0185432 | A1 | 8/2005 | Geissler |
| 2008/0298102 | A1 | 12/2008 | Geissler |
| 2010/0118572 | A1* | 5/2010 | Mednik ............ H05B 33/0818 363/90 |
| 2010/0265231 | A1* | 10/2010 | Jang ............ H02M 1/4241 345/211 |
| 2010/0265745 | A1* | 10/2010 | Xu ............ H02M 1/4258 363/126 |
| 2012/0081032 | A1 | 4/2012 | Huang |
| 2015/0036401 | A1 | 2/2015 | Murakami et al. |

FOREIGN PATENT DOCUMENTS

| | | |
|---|---|---|
| JP | 2000-071070 A | 3/2000 |
| JP | 2005-142137 A | 6/2005 |
| JP | 2006-034028 A | 2/2006 |
| JP | 2011-090901 A | 5/2011 |
| JP | 2012-023294 A | 2/2012 |
| WO | WO 2013/128506 A1 | 9/2013 |
| WO | WO 2013/128509 A1 | 9/2013 |

OTHER PUBLICATIONS

International Search Report for corresponding International Application No. PCT/JP2012/006656 mailed Jan. 22, 2013.
Form PCT/ISA/237 for corresponding International Application No. PCT/JP2012/006656 dated Jan. 22, 2013.
Extended European Search Report for corresponding European Application No. EP 12 86 9175 dated Feb. 18, 2015.

* cited by examiner (a)

(b)

(c)

(d)

DC POWER SUPPLY CIRCUIT

TECHNICAL FIELD

The present invention relates to a direct current (DC) power supply circuit, and in particular relates to an art of improving power factor of a circuit.

BACKGROUND ART

In recent years light emission efficiency of light-emitting diodes (LEDs) has improved to such an extent that LEDs are attracting attention as a light source for general illumination use. In order to drive LEDs, a DC power supply is required.

In consideration of the above, a conventional DC power supply circuit has previously been proposed in order to convert alternating current (AC) supplied by a residential AC power supply, and thereby output DC (refer to Patent Literature 1). Patent Literature 1 recites a DC power supply circuit which includes a diode bridge, a smoothing capacitor that is connected across output terminals of the diode bridge, and a voltage conversion circuit that converts voltage across terminals of the smoothing capacitor, thereby outputting a converted voltage.

CITATION LIST

Patent Literature

[Patent Literature 1] Japanese Unexamined Patent Application Publication No. 2011-90901

SUMMARY OF INVENTION

Technical Problem

However, when each half cycle of AC voltage is considered, in the DC power supply circuit current only flows from the AC power supply to the smoothing capacitor, via the diode bridge, during a period in which output voltage of the diode bridge is greater than voltage across the terminals of the smoothing capacitor. In the DC power supply circuit disclosed in Patent Literature 1, a maximum charging voltage of the smoothing capacitor is equal to a maximum value for output voltage of a rectifier circuit. Consequently, in a single cycle of alternating current supplied from the AC power supply, voltage across the terminals of the smoothing capacitor is greater than output voltage of the rectifier circuit during a quarter cycle after output voltage of the diode bridge reaches the maximum value. In the above situation, flow of current from the AC power supply to the smoothing capacitor, via the rectifier circuit, is cut-off. As a result, power factor which is calculated as the scalar product of voltage and current has a low value of approximately 0.5, roughly corresponding to a first half of each half cycle of AC.

Therefore, in order to increase an amount of time during which current flows from the AC power supply to the smoothing capacitor, via the rectifier circuit, and thus improve power factor, there is a demand that within the quarter cycle after output voltage of the diode bridge has reached the maximum value, a period is provided in which voltage across the terminals of the smoothing capacitor is lower than output voltage of the rectifier circuit.

In consideration of the problem described above, the present invention aims to provide a DC power supply circuit which enables power factor improvement.

Solution to Problem

A DC power supply circuit relating to the present invention comprises: a rectifier circuit configured to rectify AC supplied from an AC power supply; and a voltage conversion circuit connected across output terminals of the rectifier circuit and configured to convert an input voltage from the rectifier circuit so as to output a converted voltage to a load connected across output terminals of the voltage conversion circuit, wherein the voltage conversion circuit includes: a capacitor having a first terminal that is connected to one of the output terminals of the rectifier circuit located at a low-potential side of the rectifier circuit; a series circuit including an inductor and a switching element, the series circuit being included along a discharge current path for the capacitor, extending from a second terminal of the capacitor to the first terminal of the capacitor; and a charging current supply path connecting, to the second terminal of the capacitor, a first terminal of the inductor which is connected to the switching element, and supplying current from the inductor to the second terminal of the capacitor, another of the output terminals of the rectifier circuit located at a high-potential side of the rectifier circuit is connected to a second terminal of the inductor, and the voltage conversion circuit causes a first period and a second period to be alternately repeated a plurality of times during each half cycle of the AC through on-off operation of the switching element, the first period being a period during which current flows along a first current path extending from the output terminal at the high-potential side of the rectifier circuit to the output terminal at the low-potential side of the rectifier circuit, via the inductor and the switching element, and the second period being a period during which current flows along a second current path extending from the output terminal at the high-potential side of the rectifier circuit to the output terminal at the low-potential side of the rectifier circuit, via the inductor, the charging current supply path, and the capacitor.

Advantageous Effects of Invention

Through the configuration described above, during the first period current flows along the first current path which extends from the output terminal at the high-potential side of the rectifier circuit to the output terminal at the low-potential side of the rectifier circuit, via the inductor and the switching element, and during the second period current flows along the second current path which extends from the output terminal at the high-potential side of the rectifier circuit to the output terminal at the low-potential side of the rectifier circuit, via the inductor, the charging current supply path, and the capacitor. Furthermore, the first period and the second period are alternately repeated a plurality of times during each half cycle of the AC, thus enabling current to continue to flow from the rectifier circuit to the voltage conversion circuit substantially throughout the entire half cycle of AC, improving power factor of the DC power supply circuit relative to the AC power supply.

DESCRIPTION OF EMBODIMENTS

First Embodiment

<1> Configuration

Figure 1:
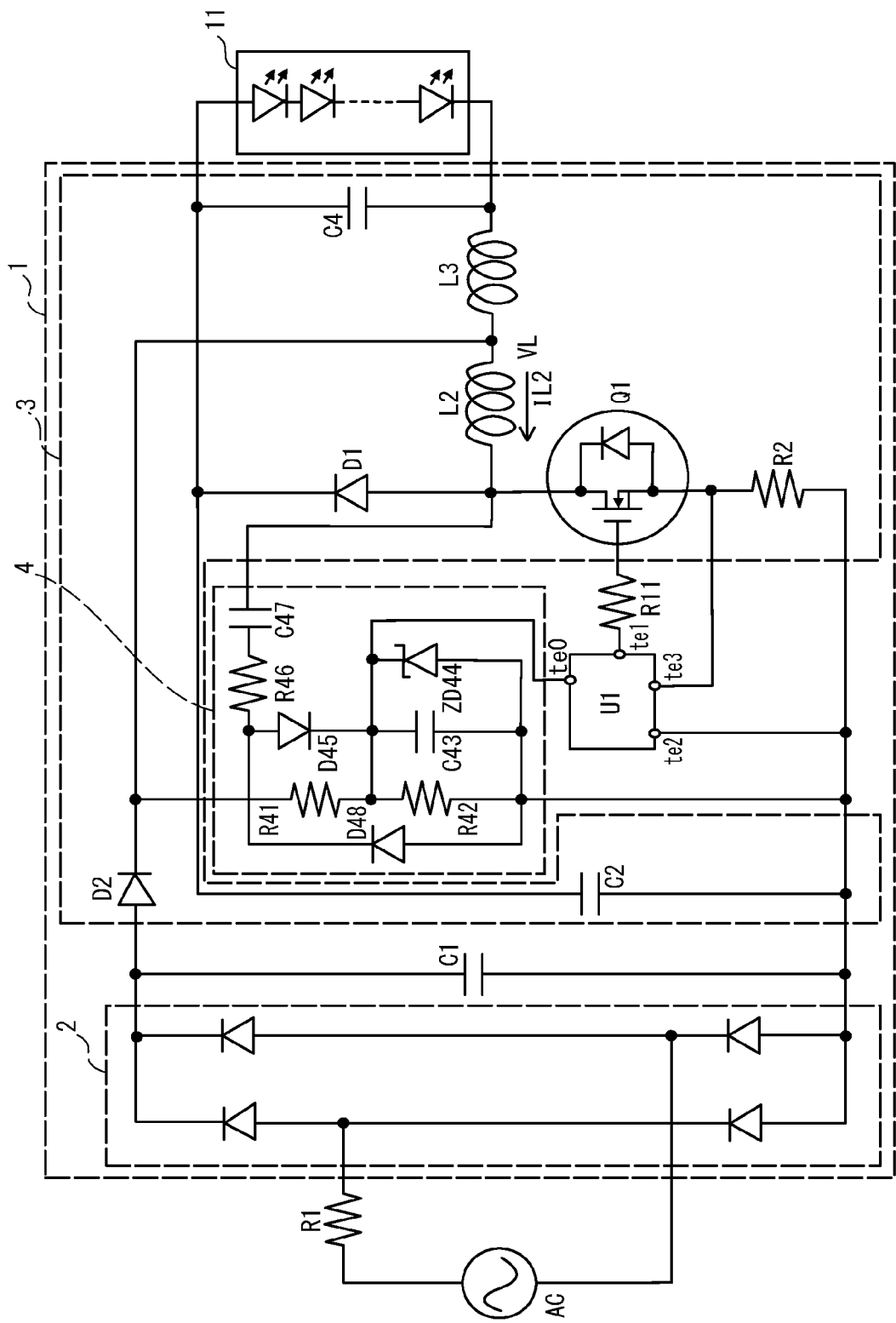
FIG. 1 is a circuit diagram illustrating a DC power supply circuit relating to a first embodiment.

FIG. 1 is a circuit diagram illustrating a DC power supply circuit 1 relating to the present embodiment.

The DC power supply circuit 1 includes a rectifier circuit 2, a voltage conversion circuit 3, a drive circuit U1, and a fixed voltage circuit 4. The rectifier circuit 2 is connected to an alternating current power supply AC. The voltage conversion circuit 3 is connected across output terminals of the rectifier circuit 2. The drive circuit U1 drives the voltage conversion circuit 3. The fixed voltage circuit 4 supplies power to the drive circuit U1.

An output terminal of the voltage conversion circuit 3 is connected to a load 11, which is formed by a plurality of LEDs connected in series. Voltage across terminals of the load 11 is determined by a number of LEDs included in the load 11. In terms of the above, the load 11 differs from a load which has resistive impedance such as a fluorescent lamp.

The power supply AC outputs AC at a voltage which for example has an actual value of 100 V. A current-limiting resistor R1 is connected between the power supply AC and the rectifier circuit 2 in order to prevent excessive current flowing from the power supply AC to the rectifier circuit 2.

<1-1> Rectifier Circuit

The rectifier circuit 2 is a diode bridge composed of four diodes.

Note that a capacitor C1 is connected across output terminals of the rectifier circuit 2 in order to block high-frequency noise. The capacitor C1 is for example an electrolytic capacitor, a high dielectric constant ceramic capacitor, or a film capacitor.

<1-2> Voltage Conversion Circuit

The voltage conversion circuit 3 is a voltage step-up circuit and includes a switching element Q1, an inductor (inductor) L2, an inductor (auxiliary inductor) L3, diodes D1 and D2, capacitors C2 and C4, and a resistor R2. The switching element Q1 is an N-channel MOSFET. A source of the switching element Q1 is connected to an output terminal at a low-potential side of the rectifier circuit 2, via the resistor R2, a gate of the switching element Q1 is connected to the drive circuit U1, via a resistor R11, and a drain of the switching element Q1 is connected to the inductor L2. The resistor R2 is provided for detection of drain current flowing in the switching element Q1 based on voltage arising across terminals of the resistor R2. A first terminal of the inductor L2 is connected to the drain of the switching element Q1 and a second terminal of the inductor L2 is connected to the inductor L3. A first terminal of the inductor L3 is connected to the second terminal of the inductor L2 and a second terminal of the inductor L3 is connected to the capacitor C4. An anode of the diode D2 is connected to an output terminal at a high-potential side of the rectifier circuit 2 and a cathode of the diode D2 is connected to the second terminal of the inductor L2. The diode D2 is provided in order to prevent reverse flow of current from the second terminal of the inductor L2 to the capacitor C1, which would otherwise occur when flow of current through the inductors L2 and L3 stops and electric potential at a node between the inductors L2 and L3 becomes greater than electric potential at a high-potential side of the capacitor C1. The diode D1 is located in a charging current supply path that supplies current to the capacitor C2 from between the inductor L2 and the switching element Q1. An anode of the diode D1 is connected to both the first terminal of the inductor L2 and the drain of the switching element Q1, and a cathode of the diode D1 is connected to the capacitor C2. A first terminal of the capacitor C2 is connected to the output terminal at the low-potential side of the rectifier circuit 2 and a second terminal of the capacitor C2 is connected to the cathode of the diode D1. A first terminal of the capacitor C4 is connected to the cathode of the diode D1 and a second terminal of the capacitor C4 is connected to the second terminal of the inductor L3. Note that a current path extending from the second terminal of the capacitor C2 to the first terminal of the capacitor C2, via the load 11, the inductor L3, the inductor L2, the switching element Q1, and the resistor R2 in respective order, is a discharge current path for the capacitor C2.

The voltage conversion circuit 3 outputs a voltage across terminals of the capacitor C4 to the load 11, which is connected in parallel to the capacitor C4.

The capacitor C2 is for example an electrolytic capacitor, a high dielectric constant ceramic capacitor, or a film capacitor.

<1-3> Drive Circuit

The drive circuit U1 outputs a control signal having a rectangular voltage waveform in order to drive the switching element Q1 through pulse width modulation (PWM) control (herein, the control signal is referred to as a PWM signal).

The drive circuit U1 includes a power supply terminal te0, an output terminal te1, a grounding terminal te2, and a current detection terminal te3, which is provided in order to detect drain current flowing through the switching element Q1. The power supply terminal te0 is connected between output terminals of the fixed voltage circuit 4. The output terminal te1 is connected to the gate of the switching element Q1, via the resistor R11. The grounding terminal te2 is connected to the output terminal at the low-potential side of the rectifier circuit 2. The current detection terminal te3 is connected between the source of the switching element Q1 and the resistor R2.

The drive circuit U1 inputs the PWM signal to the gate of the switching element Q1 and adjusts pulse width of the PWM signal in order that drain current flowing through the switching element Q1, which is detected through the current detection terminal te3, becomes constant. Adjustment of pulse width of the PWM signal alters a period during which gate voltage of the switching element Q1 is maintained at equal to or greater than a turn-on voltage of the switching element Q1, and a period during which gate voltage of the switching element Q1 is maintained at less than the turn-on voltage of the switching element Q1 (i.e., maintained at approximately 0 V). Note that the term "turn-on voltage of the switching element Q1" refers to a voltage required between the gate and the source of the switching element Q1 in order to turn on the switching element Q1. Herein, a period during which the switching element Q1 is maintained in a turned-on state is referred to as a turned-on period. Also, a period during which gate voltage of the switching element Q1 is maintained at approximately 0 V, which in other words is a period in which the switching element Q1 is maintained in a turned-off state, is referred to as a turned-off period. During a single cycle of on-off operation of the switching element Q1, a proportion of the cycle which is made up of the turned-on period is referred to as an "on-duty proportion". Thus, the drive circuit U1 drives the switching element Q1 through fixed current control by altering the on duty proportion.

<1-4> Fixed Voltage Circuit

The fixed voltage circuit 4 includes resistors R41 and R42, a capacitor C43, and a zener diode ZD44. The resistors R41 and R42 are connected in series across the output terminals of the rectifier circuit 2. A first terminal of the resistor R41 is connected to the output terminal at the high-potential side of the rectifier circuit 2. The resistor R42 is connected between a second terminal of the resistor R41 and the output terminal at the low-potential side of the rectifier circuit 2. The capacitor C43 is connected across terminals of the resistor R42. An anode of the zener diode ZD44 is connected to the output terminal at the low-potential side of the rectifier circuit 2 and a cathode of the zener diode ZD44 is connected to a node between the resistors R41 and R42, and to the power supply terminal te0 of the drive circuit U1. Through the configuration described above, electric potential of the power supply terminal te0 of the drive circuit U1 is maintained at a fixed electric potential arising at the cathode of the zener diode ZD44.

The fixed voltage circuit 4 also includes a capacitor C47, a resistor R46, and diodes D45 and D48. A first terminal of the capacitor C47 is connected to the anode of the diode D1 of the voltage conversion circuit 3. An anode of the diode D45 is connected to a second terminal of the capacitor C47, via the resistor R46, and a cathode of the diode D45 is connected to the power supply terminal te0 of the drive circuit U1. A cathode of the diode D48 is connected to a node between the resistor R46 and the anode of the diode D45, and an anode of the diode D48 is connected to the output terminal at the low-potential side of the rectifier circuit 2. The diode D48 has a function of enabling discharge of electrical charge from the capacitor C47. Through the configuration described above, the capacitors C43 and C47 are charged during each turned-off period of the switching element Q1 and the capacitor C47 is discharged during each turned-on period of the switching element Q1, thus enabling electrical charge which accumulates in the capacitor C47 to be transferred to the capacitor C43. Consequently, the above configuration enables power to be supplied from the fixed voltage circuit 4 to the power supply terminal te0 of the drive circuit U1.

<2> Operation

The following explains operation of the DC power supply circuit relating to the present embodiment.

Figure 2A:
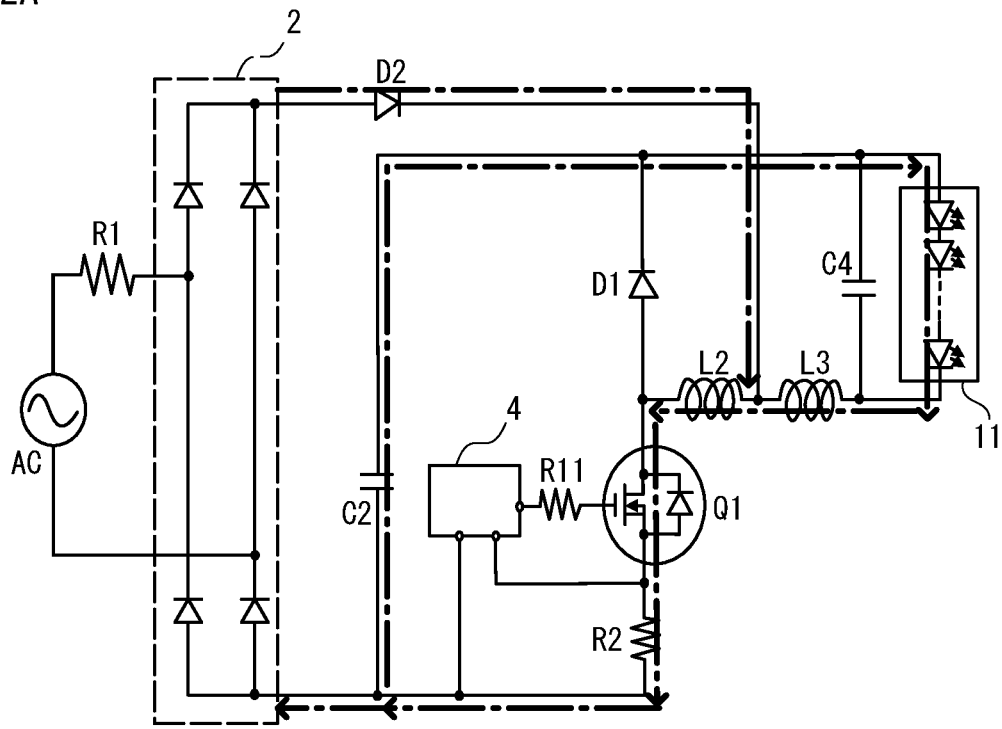
FIGS. 2A and 2B are circuit diagrams illustrating the DC power supply circuit relating to the first embodiment and flow of current in the DC power supply circuit.
Figure 2B:
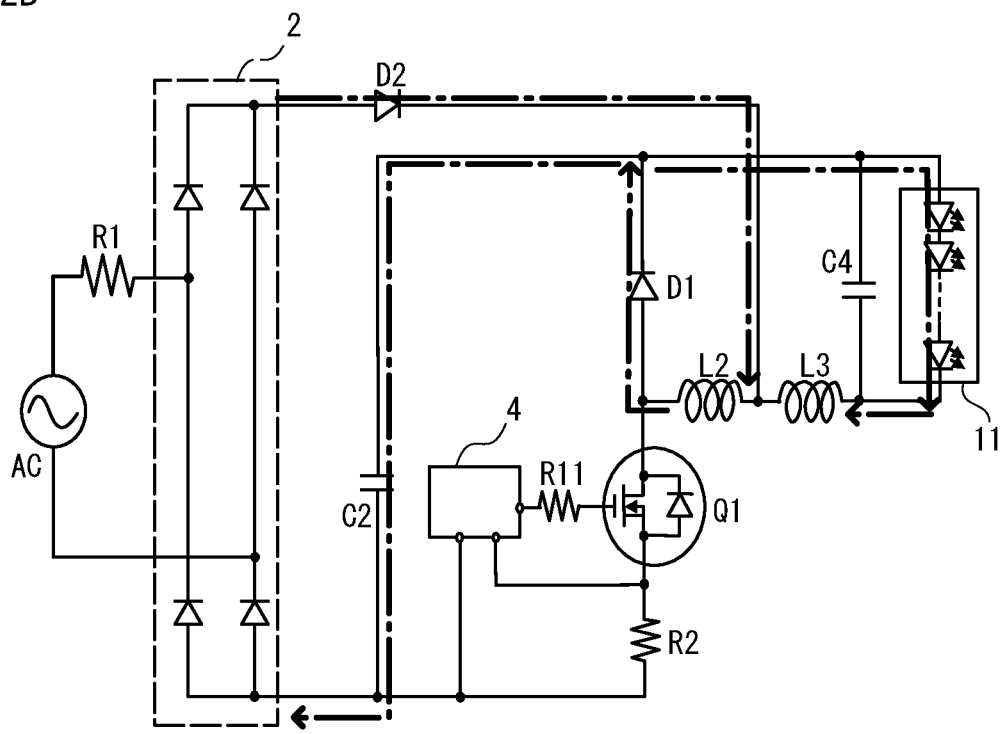

FIGS. 2A and 2B are circuit diagrams of the DC power supply circuit 1 relating to the present embodiment, and illustrate flow of current in the DC power supply circuit 1.

FIG. 2A illustrates flow of current when the switching element Q1 is in the turned-on state and FIG. 2B illustrates flow of current when the switching element Q1 is in the turned-off state.

As illustrated in FIG. 2A, when the switching element Q1 is in the turned-on state (i.e., during a first period), electric potential at the second terminal of the inductor L2 is lower than electric potential at the high-potential side of the rectifier circuit 2 by an amount equivalent to turn-on voltage of the diode D2. As a consequence, current flows along a path (herein, referred to as a first current path) extending from the output terminal at the high-potential side of the rectifier circuit 2 to the output terminal at the low-potential side of the rectifier circuit 2, via the second terminal of the inductor L2 and the switching element Q1 in respective order. At the same time, current flows along a path (herein, referred to as a third current path) extending from the second terminal of the capacitor C2 to the first terminal of the capacitor C2, via the load 11, the inductor L3, the inductor L2, the switching element Q1, and the resistor R2 in respective order. The third current path is equivalent to a discharge path for the capacitor C2. Discharge of the capacitor C2 along the third current path causes accumulation of magnetic energy in the inductors L2 and L3, and, at the same time, flow of current along the first current path from the output terminal at the high-potential side of the rectifier circuit 2 causes accumulation of magnetic energy in the inductor L2.

On the other hand, as illustrated in FIG. 2B, when the switching element Q1 is in the turned-off state (i.e., during a second period), current flows along a path (herein, referred to as a second current path) extending from the output terminal at the high-potential side of the rectifier circuit 2 to the output terminal at the low-potential side of the rectifier circuit 2, via the inductor L2, the diode D1, and the capacitor C2 in respective order. At the same time, current flows along a path (herein, referred to as a fourth current path) extending from the first terminal of the inductor L2 to the second terminal of the inductor L3, via the diode D1 and the load 11 in respective order. Flow of current along the second current path, via the capacitor C2, is cut-off upon completion of charging of the capacitor C2. The second current path is equivalent to a charging path for the capacitor C2. During the above, magnetic energy accumulated in the inductors L2 and L3 is discharged to the load 11 through current flowing along the fourth current path.

Once magnetic energy accumulated in the inductors L2 and L3 has been completely discharged, flow of current from the output terminal at the high-potential side of the rectifier circuit 2 to the diode D2 is cut-off.

Note that in the DC power supply circuit 1, voltage (first voltage) arising at the second terminal of the inductor L2 when current flows along the first current path and the third current path is set as equal to voltage (second voltage) arising at the second terminal of the inductor L2 when current flows along the second current path and the fourth current path. More specifically, the on-duty proportion of the switching element Q1 is set in the drive circuit U1 based on voltage across terminals of the load 11, number of turns in the inductors L2 and L3 (i.e., inductance of the inductors L2 and L3), and turn ratio of coils in the inductors L2 and L3. Voltage arising at the second terminal of the inductor L2 is set such as to be lower than a voltage (herein, referred to as a threshold voltage) which is lower than output voltage of the rectifier circuit 2 by an amount equal to turn-on voltage Von of the diode D2. As a consequence, current continues to flow from the rectifier circuit 2 to the voltage conversion circuit 3, so long as current continues to flow through the inductors L2 and L3.

Figure 3:
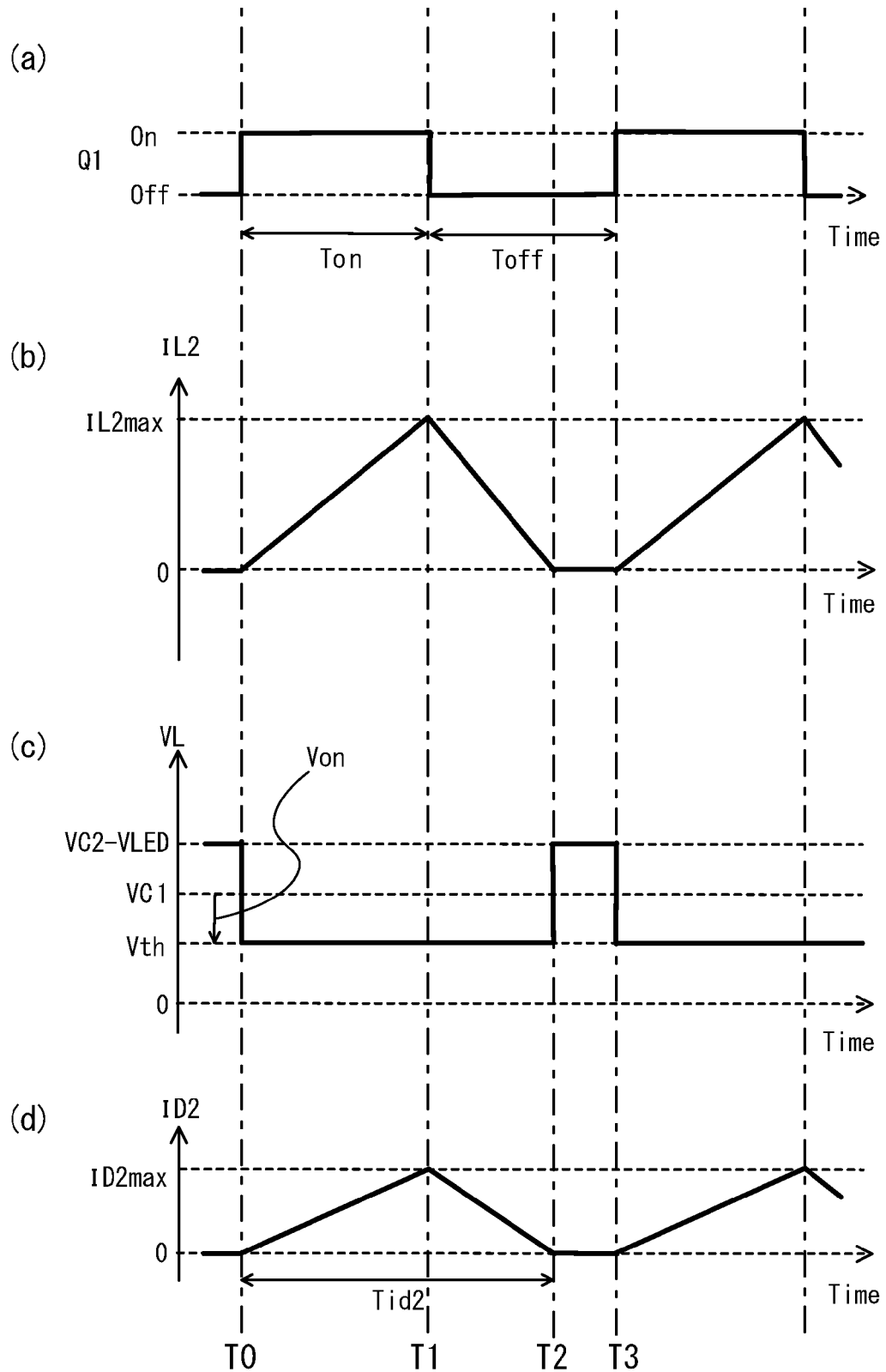
FIG. 3 illustrates, for the DC power supply circuit relating to the first embodiment, on-off operation of a switching element in section (a), a time series waveform of current flowing through an inductor in section (b), a time series waveform of voltage arising at a node between inductors in section (c), and a time series waveform of current flowing through a diode in section (d).

In FIG. 3, section (a) illustrates, for the DC power supply circuit 1, on-off operation of the switching element Q1, section (b) illustrates a time series waveform of current IL2 flowing through the inductor L2, section (c) illustrates a time series waveform of voltage arising at a node for the second terminal of the inductor L2, and section (d) illustrates a time series waveform of current flowing through the diode D2.

Upon the switching element Q1 being turned on, current begins to flow from the capacitor C2 to the inductors L3 and L2, via the load 11 (time T0 in sections (a) and (b) of FIG. 3). While the switching element Q1 is in the turned-on state, current flowing through the inductors L3 and L2 gradually increases in magnitude (period between times T0 and T1 in sections (a) and (b) of FIG. 3). During the above, a voltage arises such that electric potential on a side of the inductors L2 and L3 connected to the load 11 becomes greater than electric potential on a side of the inductors L2 and L3 connected to the switching element Q1. Furthermore, voltage VL of the second terminal of the inductor L2 is maintained at voltage Vth (herein, referred to as a threshold voltage), which is lower than voltage across terminals of the capacitor C1 by an amount equal to turn-on voltage of the diode D2 (period between times T0 and T1 in section (c) of FIG. 3). Voltage Vth is lower than voltage VC2, which arises when current is not flowing through the inductors L2 and L3, by an amount equal to voltage drop VLED of the load 11. Current flowing from the output terminal at the high-potential side of the rectifier circuit 2 to the inductor L2, via the diode D2, also increases gradually (period between times T0 and T1 in section (d) of FIG. 3).

Upon the switching element Q1 being subsequently turned off, magnetic energy accumulated in the inductors L2 and L3 begins to be discharged, and in accompaniment, current flowing through the inductors L2 and L3 begins to decrease (time T1 in sections (a) and (b) of FIG. 3). In such a situation, a voltage arises across the inductors L2 and L3 such that electric potential on the side connected to the load 11 becomes lower than electric potential on the side connected to the switching element Q1. Voltage VL of the second terminal of the inductor L2 is maintained at voltage Vth, which is lower than voltage across terminals of the capacitor C1 by the amount equal to the turn-on voltage of the diode D2 (period between times T1 and T2 in section (c) of FIG. 3). As described above, the above occurs because voltage Vth arises at the second terminal of the inductor L2 both when current flows along the paths illustrated in FIG. 2A and also when current flows along the paths illustrated in FIG. 2B. Furthermore, current flowing from the output terminal at the high-potential side of the rectifier circuit 2 to the capacitor C2, via the diode D2 and the inductor L2, gradually decreases in accompaniment to charging of the capacitor C2 (period between times T1 and T2 in section (d) of FIG. 3).

Once magnetic energy accumulated in the inductors L2 and L3 has been completely discharged, current does not flow through the inductors L2 and L3 (time T2 in section (b) of FIG. 3). Consequently, voltage of the second terminal of the inductor L2 is maintained at voltage VL0 while the switching element Q1 remains in the turned-off state (period between times T2 and T3 in section (c) of FIG. 3).

Upon the switching element Q1 being subsequently turned on, flow of current from the capacitor C2 to the inductors L2 and L3, via the load 11, restarts (time T3 in sections (a) and (b) of FIG. 3). The phenomenon described above repeats in accordance with on-off operation of the switching element Q1.

Figure 4:
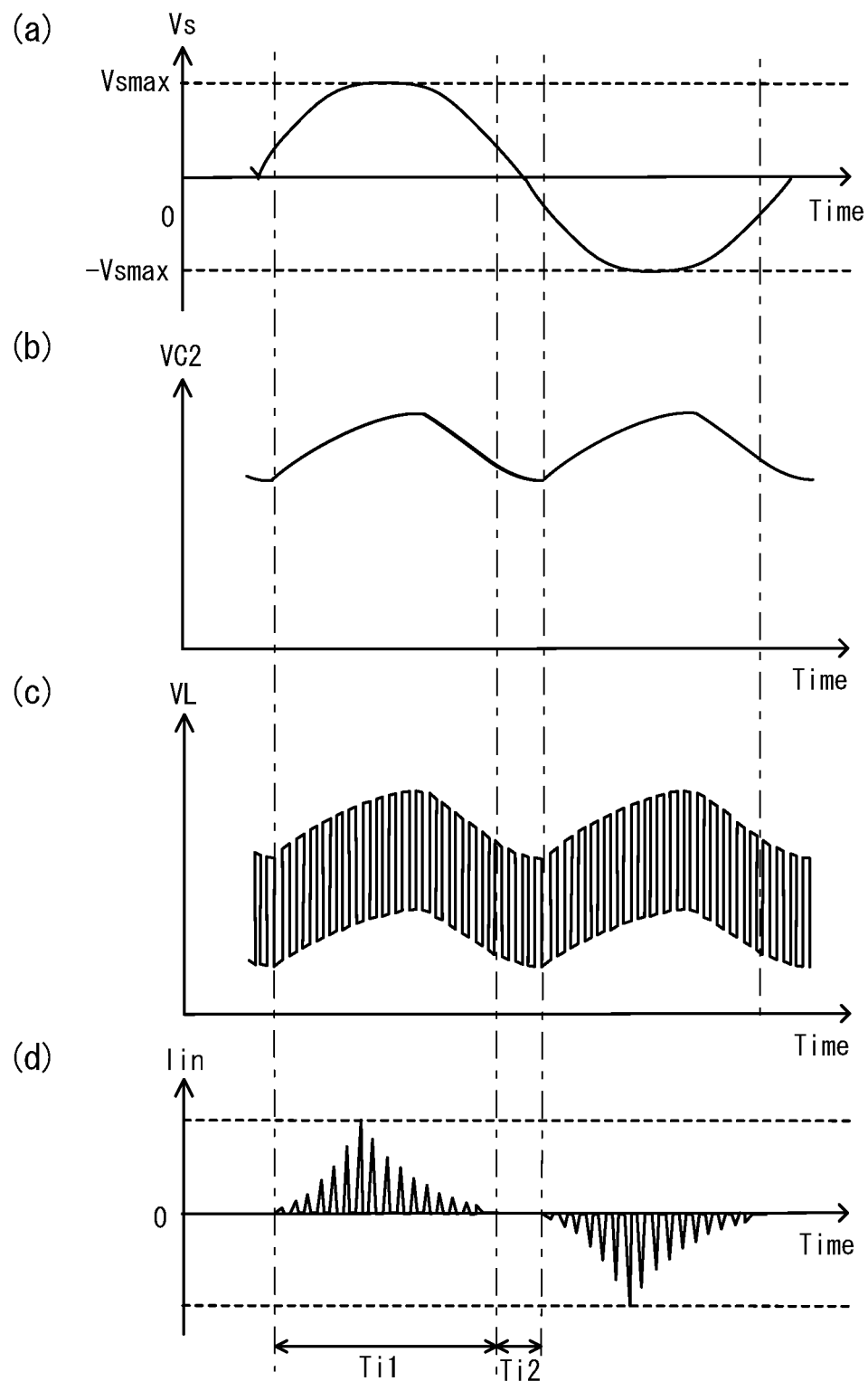
FIG. 4 illustrates, for the DC power supply circuit relating to the first embodiment, a time series waveform of input voltage to the rectifier circuit from an AC power supply in section (a), a time series waveform of voltage across terminals of a capacitor in section (b), a time series waveform of voltage at the node between the inductors in section (c), and a time series waveform of current flowing from the AC power supply to the rectifier circuit in section (d).

In FIG. 4, section (a) illustrates, for the DC power supply circuit 1, a time series waveform of input voltage to the rectifier circuit 2 from the power supply AC, section (b) illustrates a time series waveform of voltage VC2 across terminals of the capacitor C2, section (c) illustrates a time series waveform of voltage VL of the second terminal of the inductor L2, and section (d) illustrates a time series waveform of current Iin flowing from the power supply AC to the rectifier circuit 2.

The time series waveform of input voltage to the rectifier circuit 2 from the power supply AC is sinusoidal. The time series waveform of voltage VC2 across terminals of the capacitor C2 has a pulsating shape and times at which maximums of voltage VC2 occur are shifted relative to times at which maximums of absolute value of input voltage to the rectifier circuit 2 occur. The above is due to the capacitor C2 having a high electrostatic capacitance, meaning that charging to a maximum charging voltage is not possible during a single cycle of on-off operation of the switching element Q1. Threshold voltage Vth is lower than voltage across terminals of the capacitor C2 by the amount equal to turn-on voltage Von of the diode D2.

During cycles of on-off operation of the switching element Q1, voltage of the second terminal of the inductor L2 oscillates between threshold voltage Vth and voltage VC2-VLED, which is lower than voltage VC2 across terminals of the capacitor C2 by an amount equal to voltage drop VLED of the load 11.

When absolute value of input voltage Vs is greater than or equal to threshold voltage Vth (period Ti1 in FIG. 4), and when voltage VL of the second terminal of the inductor L2 is equal to threshold voltage Vth (i.e., when current flows through inductors L2 and L3), the diode D2 is in a conducting state and current flows from the high-potential side of the rectifier circuit 2 toward the voltage conversion circuit 3. In accompaniment to the above, current Iin flows from the power supply AC to the rectifier circuit 2. On the other hand, when voltage VL is equal to voltage VC2-VLED, which is lower than voltage VC2 by the amount equal to voltage drop VLED of the load 11 (i.e., when current does not flow through the inductors L2 and L3), the diode D2 is in a non-conducting state and flow of current from the high-potential side of the rectifier circuit 2 toward the voltage conversion circuit 3 is cut-off. In other words, flow of current from the output terminal at the high-potential side of the rectifier circuit 2 to the second terminal of the inductor L2 is synchronized with on-off operation of the switching element Q1.

When absolute value of input voltage Vs is less than threshold voltage Vth (period Ti2 in FIG. 4), the diode D2 remains in a non-conducting state and flow of current from the power supply AC to the voltage conversion circuit 3, via the rectifier circuit 2, is completely cut-off.

Figure 5:
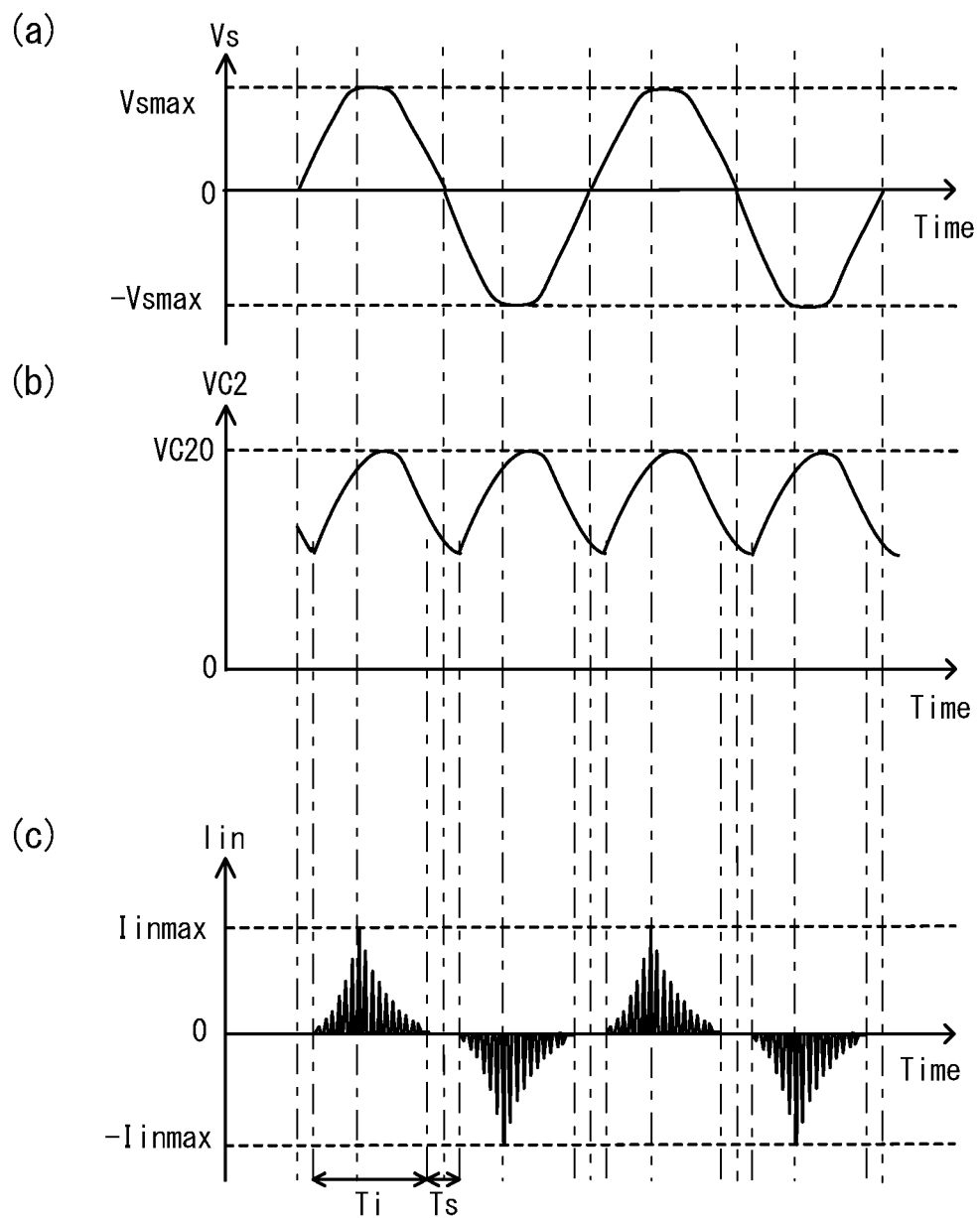
FIG. 5 illustrates, for the DC power supply circuit relating to the first embodiment, a time series waveform of input voltage to a rectifier circuit 2 from a power supply AC in section (a), a time series waveform of voltage across terminals of a capacitor C2 in section (b), and a time series waveform of current Iin flowing from the power supply AC to the rectifier circuit 2 in section (c).

In FIG. 5, section (a) illustrates, for the DC power supply circuit 1, a time series waveform of input voltage to the rectifier circuit 2 from the power supply AC, section (b) illustrates a time series waveform of voltage VC2 across terminals of the capacitor C2, and section (c) illustrates a time series waveform of current Iin flowing from the power supply AC to the rectifier circuit 2.

As illustrated in sections (b) and (c) of FIG. 5, alternate repetition occurs of period Ti and period Ts. During period Ti, current flows from the power supply AC to the rectifier circuit 2. During period Ts, flow of current from the power supply AC to the rectifier circuit 2 is cut-off. Note that in each half cycle of input voltage Vs, a period during which current Iin flows from the power supply AC to the rectifier circuit 2, even after the absolute value of input voltage Vs has reached a maximum value, is present in period Ti. As a consequence, power factor is improved compared to a configuration in which a period does not exist during which current flows from the power supply AC to the rectifier circuit 2 after absolute value of input voltage Vs has reached the maximum value (herein, referred to as a configuration relating to a comparative example). In fact, power factor in the configuration relating to the comparative example is only in a range from approximately 0.56 to 0.61, whereas the DC power supply circuit 1 relating to the present embodiment enables power factor of 0.8 or greater.

In the configuration relating to the comparative example, a time at which input current Iin to the rectifier circuit 2 from the power supply AC is at a maximum value corresponds to a time during a half cycle of input voltage Vs at which approximately a quarter cycle has passed since a start point of the half cycle. In contrast, as illustrated in sections (b) and (c) of FIG. 5, in the DC power supply circuit 1 relating to the present embodiment, a time at which input current Iin to the rectifier circuit 2 from the power supply AC is at a maximum value occurs closer to a time at which output voltage Vin of the rectifier circuit 2 is at a maximum value. Furthermore, the time series waveform of input current Iin to the DC power supply circuit 1 clearly has improved lateral symmetry compared to the configuration relating to the comparative example. Thus, compared to the configuration relating to the comparative example, in the DC power supply circuit 1 there is a reduced amount of shift between times at which input current Iin to the rectifier circuit 2 from the power supply AC is at a maximum value and times at which output voltage Vin is at a maximum value, and lateral symmetry of the time series waveform of input current Iin is improved. Consequently, compared in the configuration relating to the comparative example, in the DC power supply circuit 1 a proportion of input current Iin which is a high-frequency component is reduced. An advantageous effect of the above is that emission of high-frequency noise from a device including the DC power supply circuit 1 can be suppressed by an amount corresponding to the aforementioned reduction in the high-frequency component.

Magnitude of current flowing from the high-potential side of the rectifier circuit 2 to the inductor L2 when current is flowing through the inductors L2 and L3 can be adjusted by adjusting inductance of the inductors L2 and L3. In particular, the aforementioned current can be increased by increasing inductance of inductor L2. Increasing inductance of the inductor L2 enables the inductor L2 to accumulate a greater amount of energy. An increase in inductance of the inductor L2 is considered to be accompanied by an increase in force causing flow of current from the high-potential side of the rectifier circuit 2, hence causing an increase in the aforementioned current. In such a situation, it is necessary to adjust inductance of the inductor L3 based on the relationship to the inductor L2 and the load 11, such that a desired voltage division ratio is obtained.

<3> Conclusion

To summarize, in the DC power supply circuit 1 relating to the present embodiment, during the first period, current flows along the first current path which extends from the output terminal at the high-potential side of the rectifier circuit 2 to the output terminal at the low-potential side of the rectifier circuit 2, via the inductor L2 and the switching element Q1. On the other hand, during the second period, current flows along the second current path which extends from the output terminal at the high-potential side of the rectifier circuit 2 to the output terminal at the low-potential side of the rectifier circuit 2, via the inductor L2, the charging current supply path, and the capacitor C2. The first period and the second period are alternately repeated a plurality of times during each half cycle of AC. As a result, current continues to flow from the rectifier circuit 2 to the voltage conversion circuit 3 substantially throughout the entire half cycle of AC, improving power factor relative to the power source AC.

In the DC power supply circuit 1 relating to the present embodiment, current flows from the capacitor C1 to the inductor L2, via the second terminal of inductor L2, both when the switching element Q1 is in the turned-on state (i.e., during the first period) and also when the switching element Q1 is in the turned-off state (i.e., during the second period). The above promotes discharge of the capacitor C1 such that voltage across terminals of the capacitor C1 is reduced to less than or equal to output voltage of the rectifier circuit 2, and thus enables continued supply of current from the power supply AC to the voltage conversion circuit 3, via the rectifier circuit 2. In other words, an amount of time during which current flows from the power supply AC to the capacitor C1, via the rectifier circuit 2, can be lengthened, enabling power factor to be improved by a corresponding amount.

Typically, in a DC power supply circuit that is designed in order to improve power factor, the DC power supply circuit has a configuration in which a power factor correction (PFC) circuit is connected to a rectifier circuit, and a voltage conversion circuit is connected downstream of the PFC circuit. The PFC circuit includes elements such as a switching element, an inductor, and a control IC. In contrast to the above, in the DC power supply circuit 1 relating to the present embodiment, power factor improvement is achieved without providing a PFC circuit. Consequently, the DC power supply circuit 1 relating to the present embodiment enables reduction in circuit size and also enables improved circuit efficiency by eliminating power loss caused by the PFC circuit.

Second Embodiment

Figure 6:
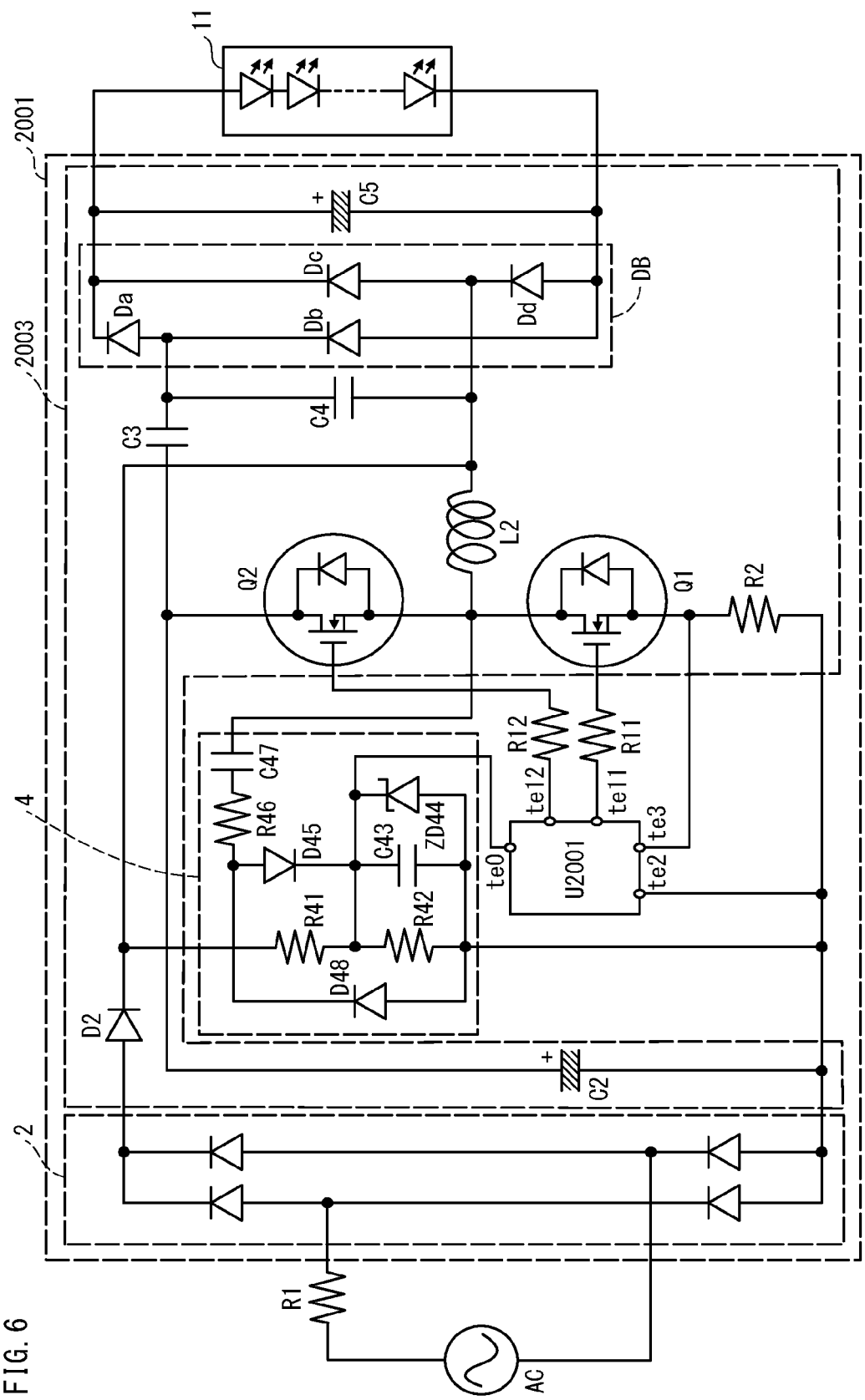
FIG. 6 is a circuit diagram illustrating a DC power supply circuit relating to a second embodiment.

FIG. 6 is a circuit diagram illustrating a DC power supply circuit 2001 relating to the present embodiment.

The DC power supply circuit 2001 includes a rectifier circuit 2, a voltage conversion circuit 2003, a drive circuit U2001, and a fixed voltage circuit 4. The rectifier circuit 2 is connected to an alternating current power supply AC. The voltage conversion circuit 2003 is connected across output terminals of the rectifier circuit 2. The drive circuit U2001 drives the voltage conversion circuit 2003. The fixed voltage circuit 4 supplies power to the drive circuit U2001.

In the DC power supply circuit 2001 relating to the present embodiment, configuration of the voltage conversion circuit 2003 and the drive circuit U2001 differ to the first embodiment. Note that elements of configuration that are the same as in the first embodiment are labeled using the same reference signs and explanation thereof is omitted where appropriate.

The voltage conversion circuit 2003 includes a switching element Q1 (switching element) and a switching element Q2 (auxiliary switching element), an inductor L2, a diode D2, a diode bridge (current supply circuit) DB, capacitors C2, C3, C4 and C5, and a resistor R2.

A first terminal of the capacitor C2 is connected to an output terminal at a low-potential side of the rectifier circuit 2. The capacitor C2 is an electrolytic capacitor. Note that alternatively the capacitor C2 may for example be a high dielectric constant ceramic capacitor or a film capacitor.

A first terminal of the capacitor (resonance capacitor) C3 is connected to a second terminal of the capacitor C2 and a second terminal of the capacitor C3 is connected to a first input terminal of the diode bridge DB.

A first terminal of the inductor L2 is connected to a node between the switching element Q1 and the switching element Q2, and a second terminal of the inductor L2 is connected to a second input terminal of the diode bridge DB.

The switching element Q1 is an N-channel MOSFET. A source of the switching element Q1 is connected to an output terminal at a low-potential side of the rectifier circuit 2, via the resistor R2, a gate of the switching element Q1 is connected to the drive circuit U2001, via the resistor R11, and a drain of the switching element Q1 is connected to the inductor L2. The switching element Q2 is located in a charging current supply path for supplying charging current to the capacitor C2 from between the inductor L2 and the switching element Q1. The switching element Q2 is an N-channel MOSFET. A source of the switching element Q2 is connected to the inductor L2 and the drain of the switching element Q1, a gate of the switching element Q2 is connected to the drive circuit U2001, via the resistor R12, and a drain of the switching element Q2 is connected to the capacitor C2. The resistor R2 is provided in order to detect drain current flowing in the switching element Q1 based on voltage arising across terminals of the resistor R2.

An anode of the diode D2 is connected to an output terminal at a high-potential side of the rectifier circuit 2 and a cathode of the diode D2 is connected to a node between the inductor L2 and the diode bridge DB.

The capacitor C4 is connected across the first and second input terminals of the diode bridge DB. The capacitor C4 has a function of smoothing input voltage of the rectifier circuit 2.

The first input terminal of the diode bridge DB is connected to the second terminal of the capacitor C3. A load 11 is connected across two output terminals of the diode bridge DB. The diode bridge DB is formed by four diodes Da, Db, Dc, and Dd. Respective cathodes of the diodes Da and Dc are connected to a first terminal of the load 11, and respective anodes of the diodes Db and Dd are connected to a second terminal of the load 11. An anode of the diode Da is connected to a cathode of the diode Db and an anode of the diode Dc is connected to a cathode of the diode Dd. The anode of the diode Da and the cathode of the diode Db are connected to the second terminal of the capacitor C3. The anode of the diode Dc and the cathode of the diode Dd are connected to the second terminal of the inductor L2.

The capacitor C5 is connected across the output terminals of the diode bridge DB. The capacitor C5 has a function of smoothing voltage applied to the load 11.

The drive circuit U2001 outputs a control signal having a rectangular voltage waveform in order to drive the switching element Q1 through PWM control (herein, the control signal is referred to as a PWM signal).

The drive circuit U2001 includes a power supply terminal te0, a grounding terminal te2, a current detection terminal te3, and output terminals te11 and te12. The power supply terminal te0 is connected to an output terminal of the fixed voltage circuit 4. The grounding terminal te2 is connected to the output terminal at the low-potential side of the rectifier circuit 2. The current detection terminal te3 is provided in order to detect drain current flowing in the switching element Q1. The current detection terminal te3 is connected to a node between the source of the switching element Q1 and the resistor R2. The output terminal te11 is connected to the gate of the switching element Q1, via the resistor R11, and the output terminal te12 is connected to the gate of the switching element Q2, via the resistor R12. The drive circuit U2001 is formed as a single integrated circuit.

The drive circuit U2001 inputs PWM signals to the respective gates of the switching elements Q1 and Q2, and adjusts pulse width of the PWM signals such that drain current flowing in the switching element Q1, which is detected through the current detection terminal te3, becomes constant. The PWM signal input to the gate of the switching element Q2 has an opposite phase relative to the PWM signal input to the gate of the switching element Q1. As a result of the configuration described above, operation of the switching elements Q1 and Q2 is performed such that the switching element Q2 is turned off when the switching element Q1 is turned on, and conversely the switching element Q2 is turned on when the switching element Q1 is turned off. A change in pulse width of the PWM signal input into the switching element Q1 causes a change in a proportion of time during which gate voltage of the switching element Q1 is greater than or equal to turn-on voltage of the switching element Q1, which in other words is a proportion of time (herein, referred to as an on-duty proportion) during which the switching element Q1 is maintained in a turned-on state. An on-duty proportion of the switching element Q2 changes in accordance with the above. The drive circuit U2001 drives the switching element Q1 as described above through fixed current control.

The fixed voltage circuit 4 includes the same configuration elements as in the first embodiment. A first terminal of a capacitor C47 is connected to a resistor R46 and a second terminal of the capacitor C47 is connected to a node between the switching elements Q1 and Q2 in the voltage conversion circuit 2003. A capacitor C43 and the capacitor C47 are charged during a period in which the switching element Q1 is in the turned-off state and the switching element Q2 is in the turned-on state, and the capacitor C47 is discharged during a period in which the switching element Q1 is in the turned-on state and the switching element Q2 is in the turned-off state, thereby causing electrical charge accumulated in the capacitor C47 to be transferred to the capacitor C43.

The following explains operation of the DC power supply circuit relating to the present embodiment.

Figure 7:
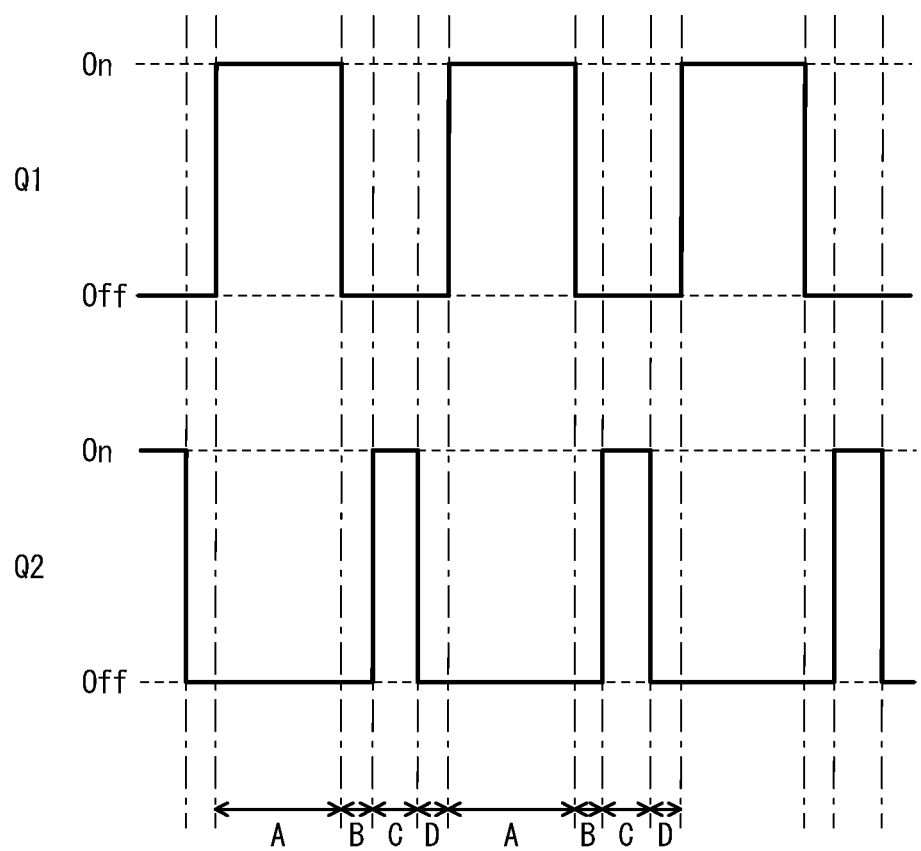
FIG. 7 is provided in order to explain operation of the DC power supply circuit relating to the second embodiment.

FIG. 7 is a time chart illustrating on-off operation of the switching elements Q1 and Q2 in the DC power supply circuit 2001. FIGS. 8A, 8B, 9A, 9B, 10A, and 10B are circuit diagrams of the DC power supply circuit 2001, illustrating flow of current in the DC power supply circuit 2001.

As illustrated in FIG. 7, period A (first period) during which the switching element Q1 is in the turned-on state and the switching element Q2 is in the turned-off state is followed by period B during which the switching elements Q1 and Q2 are both in the turned-off state. Period B is followed by period C (second period) during which the switching element Q1 is in the turned-off state and the switching element Q2 is in the turned-on state. Period C is followed by period D during which, once again, the switching elements Q1 and Q2 are both in the turned-off state. Periods A to D are repeated in respective order, thereby causing alternate repetition of periods A and C. Furthermore, during transition from period A, in which the switching element Q1 is in the turned-on state and the switching element Q2 is in the turned-off state, to period C, in which the switching element Q1 is in the turned-off state and the switching element Q2 is in the turned-on state, period B is present in which the switching elements Q1 and Q2 are both in the turned-off state. Likewise, during transition from period C, in which the switching element Q1 is in the turned-off state and the switching element Q2 is in the turned-on state, to period A, in which the switching element Q1 is in the turned-on state and the switching element Q2 is in the turned-off state, period D is present in which the switching elements Q1 and Q2 are both in the turned-off state. Presence of period B and period D ensures that at any point in time, at least one of the switching elements Q1 and Q2 is in the turned-off state. If a period is present in which the switching elements Q1 and Q2 are both in the turned-on state, a malfunction may occur in the DC power supply circuit 2001.

Figure 8A:
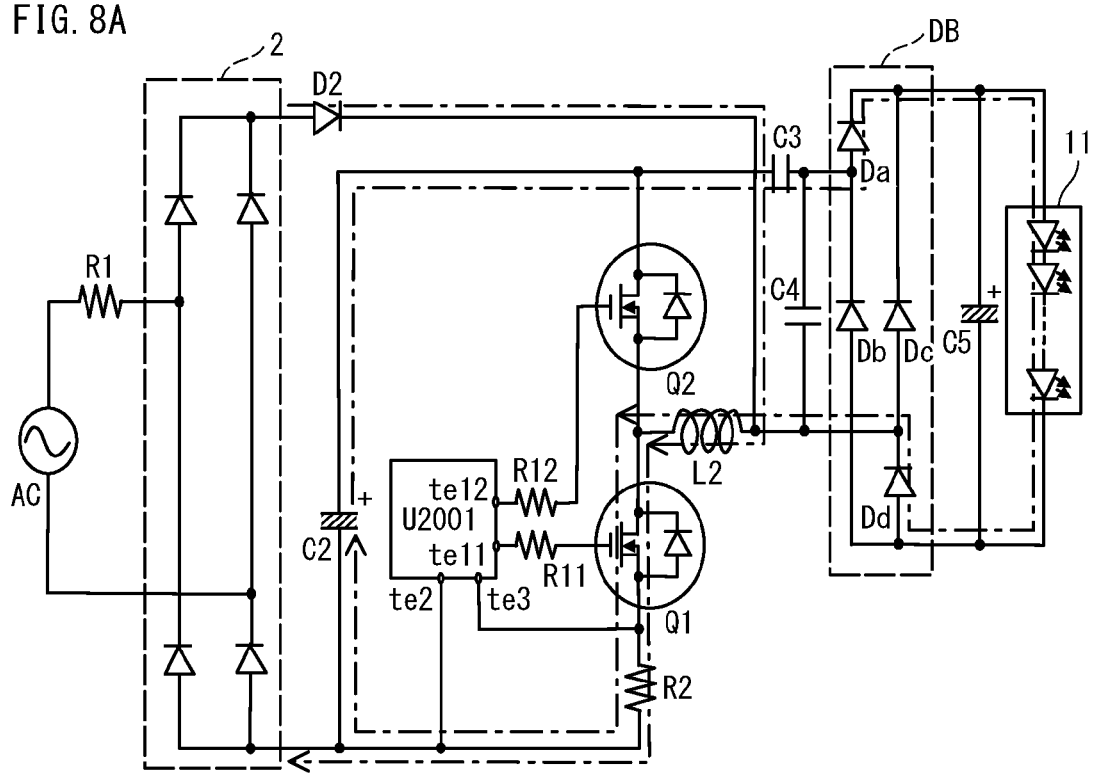
FIGS. 8A and 8B are circuit diagrams illustrating the DC power supply circuit relating to the second embodiment and flow of current in the DC power supply circuit.

FIG. 8A illustrates flow of current during period A, in which the switching element Q1 is in the turned-on state and the switching element Q2 is in the turned-off state.

During period A, current flows along a path (herein, referred to as a first current path) extending from the output terminal at the high-potential side of the rectifier circuit 2 to the output terminal at the low-potential side of the rectifier circuit 2, via the inductor L2, the switching element Q1, and the resistor R2. At the same time, current flows along a path (herein, referred to as a third current path) extending from the second terminal of the capacitor C2 to the first terminal of the capacitor C2, via the capacitor C3, the diode Da, the load 11, the diode Dd, the inductor L2, the switching element Q1, and the resistor R2 in respective order. During the above, electric potential at a node between the inductor L2 and the diode bridge DB is maintained at a magnitude lower than electric potential at the output terminal at the high-potential side of the rectifier circuit 2 by an amount equal to turn-on voltage Von of the diode D2. The third current path is equivalent to a discharge current path along which electrical charge, previously accumulated in the capacitor C2 during a period in which the switching element Q1 was in the turned-off state and the switching element Q2 was in the turned-on state, is discharged to the load 11, via the diode bridge DB.

During the above, magnetic energy accumulates in the inductor L2 as a result of current flowing along the first current path from the output terminal at the high-potential side of the rectifier circuit 2 and discharge current flowing along the third current path from the capacitor C2.

Subsequently, the switching elements Q1 and Q2 are both turned off.

Figure 8B:
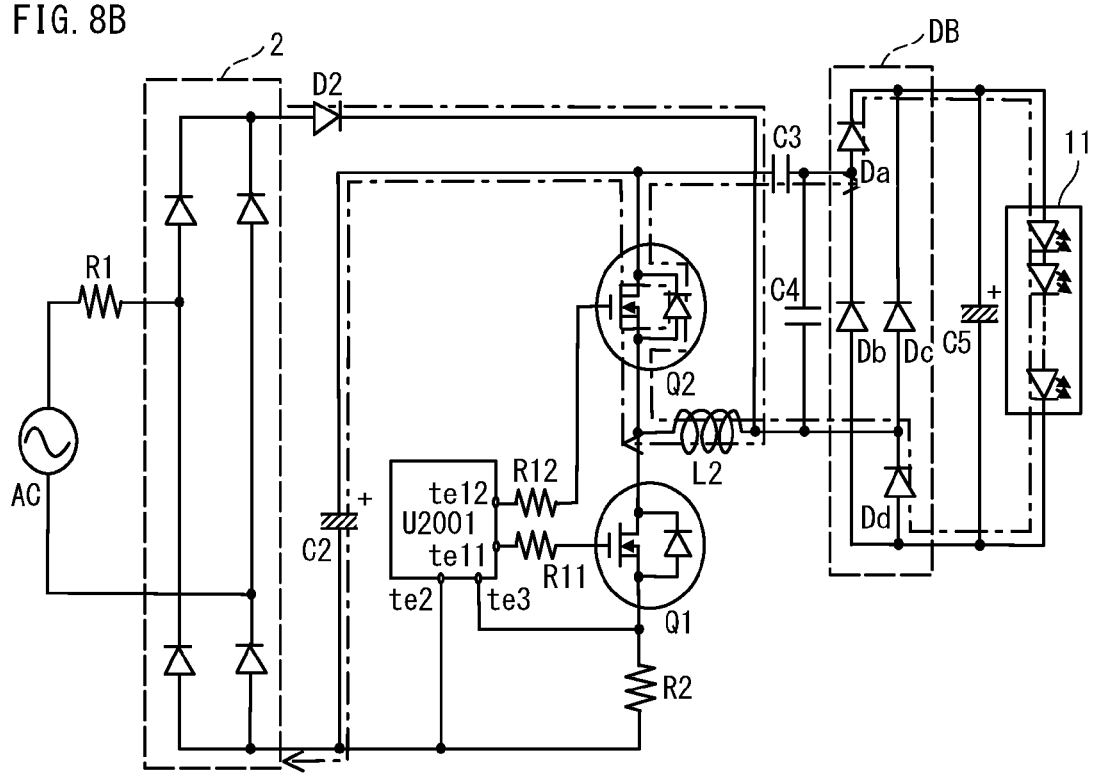

FIG. 8B illustrates flow of current during period B, in which the switching elements Q1 and Q2 are both in the turned-off state.

During period B, current flows along a path (herein, referred to as current path A) extending from the output terminal at the high-potential side of the rectifier circuit 2 to the output terminal at the low-potential side of the rectifier circuit 2, via the inductor L2, a body diode of the switching element Q2, and the capacitor C2. At the same time, current flows along a path (herein, referred to as current path B) extending from the first terminal of the inductor L2 to the second terminal of the inductor L2, via the body diode of the switching element Q2, the capacitor C3, the diode Da, the load 11, and the diode Dd in respective order. During the above, electric potential at the node between the inductor L2 and the diode bridge DB is maintained at the magnitude lower than electric potential at the output terminal at the high-potential side of the rectifier circuit 2 by the amount equal to turn-on voltage Von of the diode D2. The switching element Q2 is subsequently turned on.

Figure 9A:
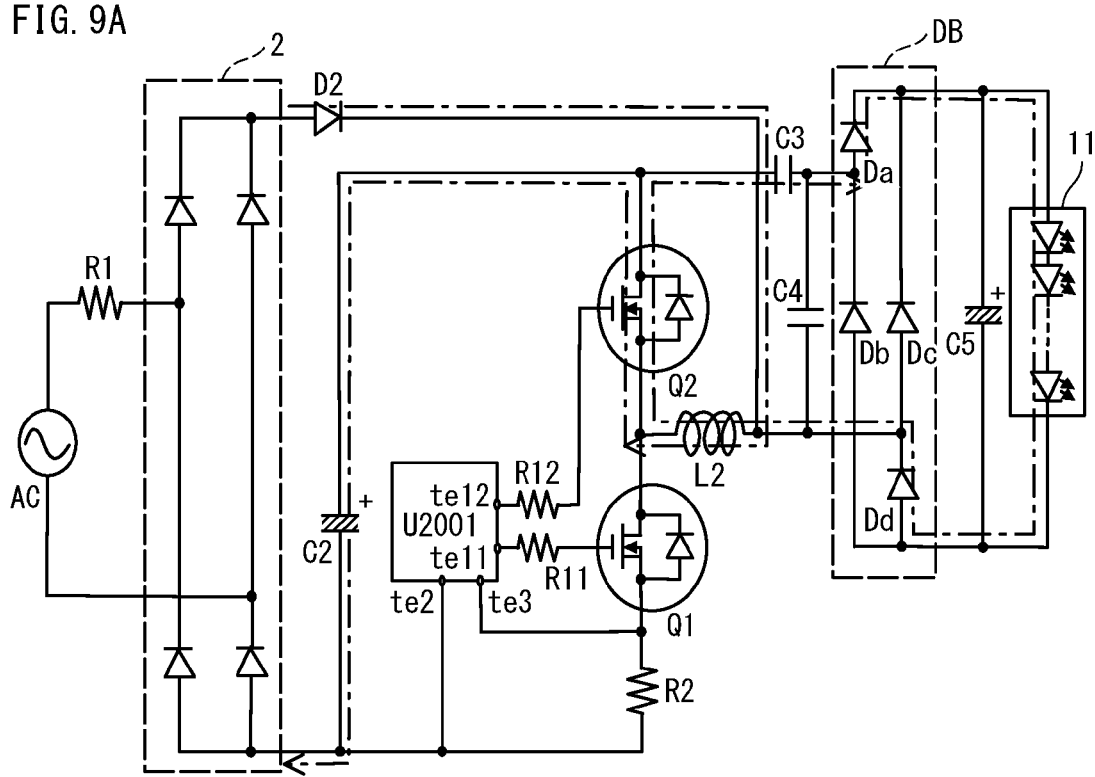
FIGS. 9A and 9B are circuit diagrams illustrating the DC power supply circuit relating to the second embodiment and flow of current in the DC power supply circuit.
Figure 9B:
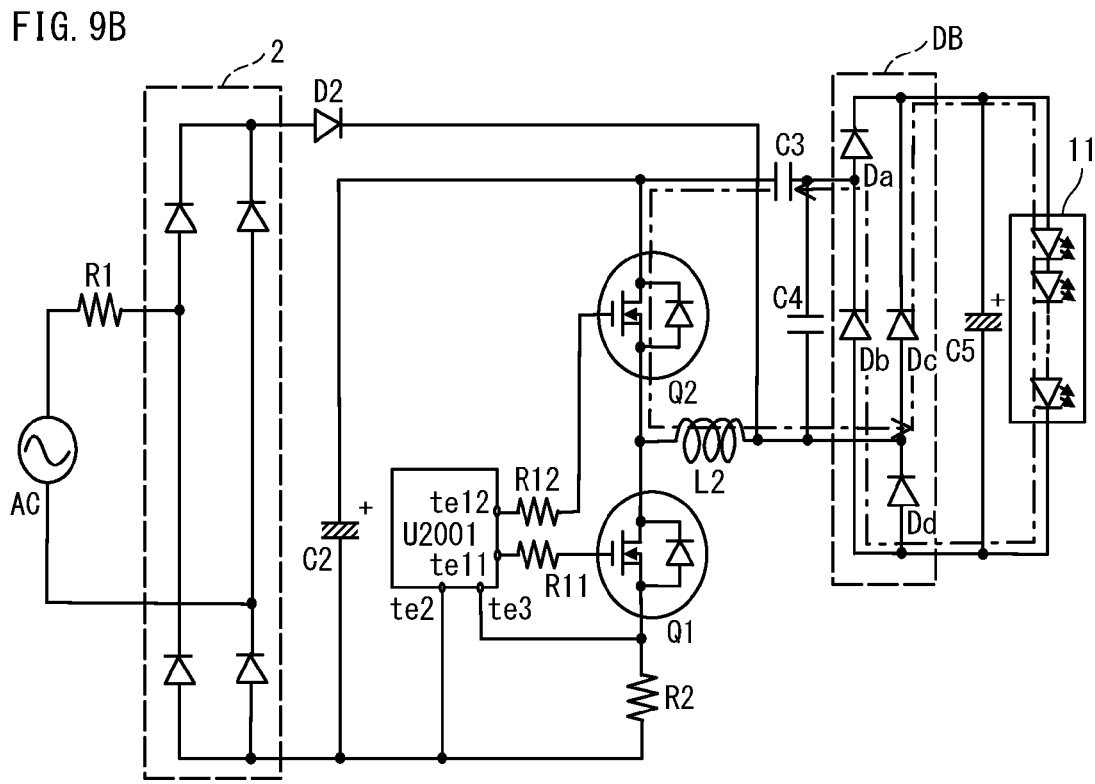

FIGS. 9A and 9B illustrate flow of current during period C, in which the switching element Q1 is in the turned-off state and the switching element Q2 is in the turned-on state.

As illustrated in FIG. 9A, during period C, current flows along a path (herein, referred to as a second current path) extending from the output terminal at the high-potential side of the rectifier circuit 2 to the output terminal at the low-potential side of the rectifier circuit 2, via the inductor L2, the switching element Q2, and the capacitor C2. At the same time, current flows along a path (herein, referred to as a fourth current path) extending from the first terminal of the inductor L2 to the second terminal of the inductor L2, via the capacitor C3, the diode Da, the load 11, and the diode Dd in respective order. During the above, electric potential at the node between the inductor L2 and the diode Dd is maintained at the magnitude lower than electric potential at the output terminal at the high-potential side of the rectifier circuit 2 by the amount equal to turn-on voltage Von of the diode D2. The fourth current path is equivalent to an energy discharge path along which magnetic energy accumulated in the inductor L2 is discharged to the load 11, via the diode bridge DB.

Note that flow of current along the second current path is cut-off once charging of the capacitor C2 is complete. Current continues to flow along the fourth current path until charging of the capacitor C3 is complete.

In the above situation, the capacitor C3 is charged in accompaniment to discharge of magnetic energy accumulated in the inductor L2.

As illustrated in FIG. 9B, upon completion of charging of the capacitor C3 during period C, discharge from the capacitor C3 starts soon thereafter causing current to flow along a path (herein, referred to as a fifth current path) extending from the first terminal of the capacitor C3 to the second terminal of the capacitor C3, via the switching element Q2, the inductor L2, the diode Dc, the load 11, and the diode Db in respective order.

As a result of current flowing along the fifth current path from the capacitor C3, magnetic energy accumulates in the inductor L2 and current is supplied to the load 11.

The switching element Q2 is subsequently turned off such that the switching elements Q1 and Q2 are both in the turned-off state.

Figure 10A:
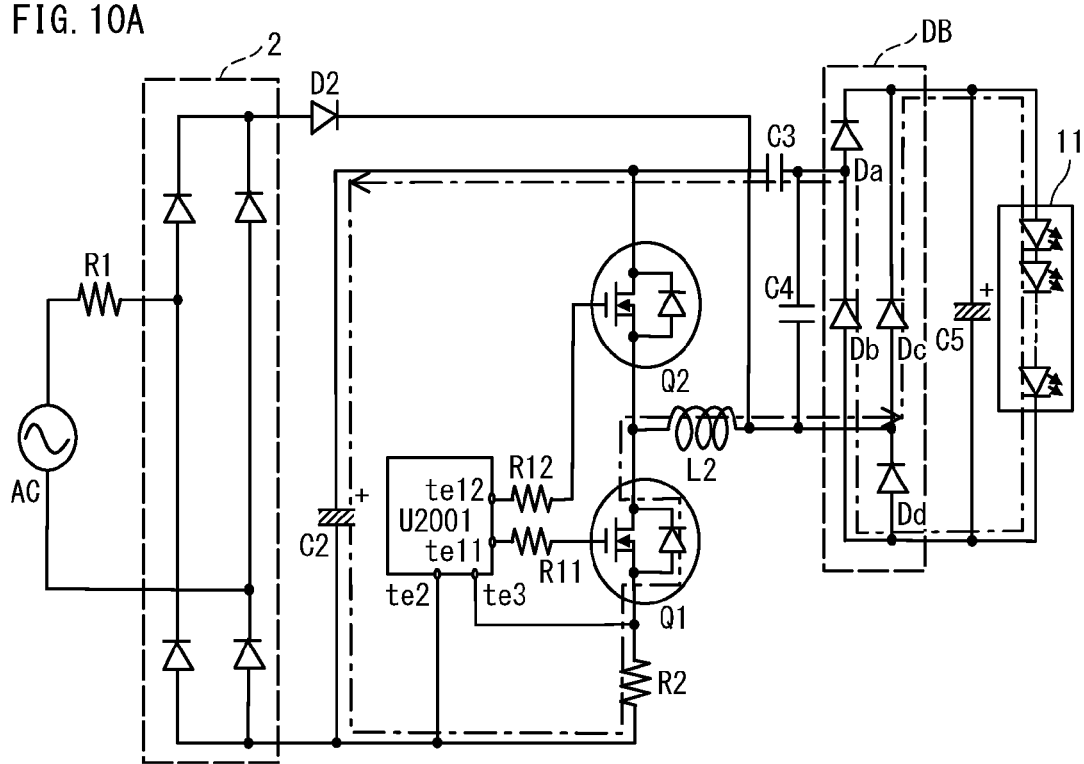
FIGS. 10A and 10B are circuit diagrams illustrating the DC power supply circuit relating to the second embodiment and flow of current in the DC power supply circuit.

FIG. 10A illustrates flow of current during period D, in which the switching elements Q1 and Q2 are both in the turned-off state.

During period D, current flows along a path (herein, referred to as current path C) from the first terminal of the capacitor C3 to the second terminal of the capacitor C3, via the capacitor C2, the resistor R2, a body diode of the switching element Q1, the inductor L2, the diode Dc, the load 11, and the diode Db in respective order. The switching element Q1 is subsequently turned on.

Figure 10B:
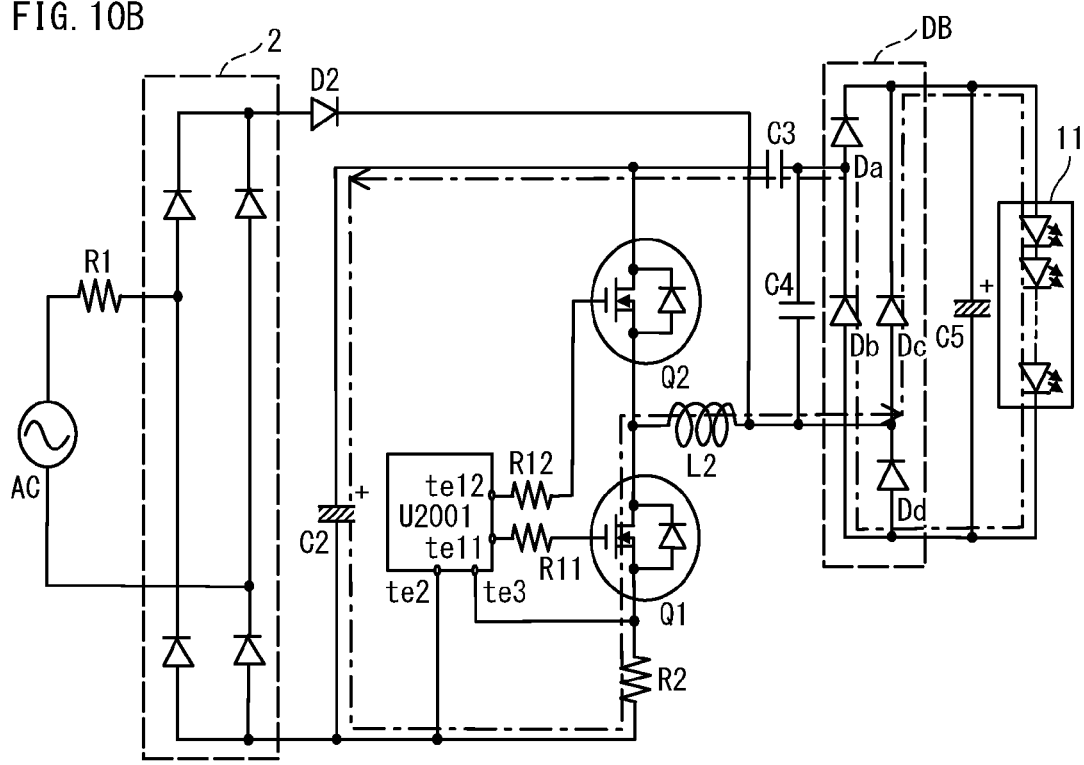

FIG. 10B illustrates flow of current during a period (period A), in which the switching element Q1 is in the turned-on state and the switching element Q2 is in the turned-off state.

During period A, current flows along a path (herein, referred to as a sixth current path) extending from the first terminal of the capacitor C3 to the second terminal of the capacitor C3, via the capacitor C2, resistor R2, the switching element Q1, the inductor L2, the diode Dc, the load 11, and the diode Db in respective order. As a result of current flowing along the sixth current path from the capacitor C3, magnetic energy accumulates in the inductor L2.

Upon subsequent completion of discharge from the capacitor C3, current flowing from the inductor L2 flows along the sixth current path. During the above, the capacitor C3 is charged such that the first terminal of the capacitor C3, which is closest to the capacitor C2, has a lower electric potential than the second terminal of the capacitor C3, which is closest to the diode bridge DB.

Upon completion of charging of the capacitor C3, current once again flows along the first current path from the output terminal at the high-potential side of the rectifier circuit 2, and, at the same time, current flows along the third current path from the second terminal of the capacitor C2. During the above, the capacitors C2 and C3 are discharged.

The operations described above with reference to FIGS. 8A, 8B, 9A, 9B, 10A, and 10B are subsequently repeated.

Figure 11:
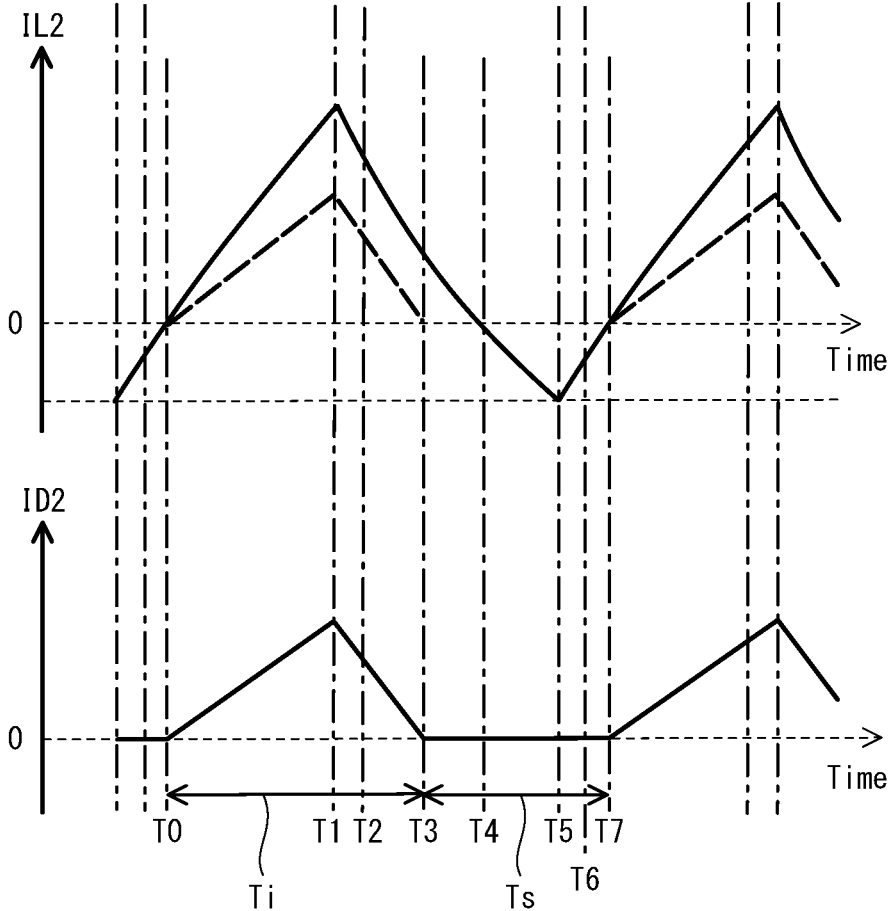
FIG. 11 illustrates, for the DC power supply circuit relating to the second embodiment, on-off operation of a switching element in section (a), a time series waveform of current flowing through an inductor in section (b), and a time series waveform of current flowing through a diode in section (c).

In FIG. 11, section (a) illustrates, for the DC power supply circuit 2001, on-off operation of the switching elements Q1 and Q2, section (b) illustrates a time series waveform of current IL2 flowing through the inductor L2, and section (c) illustrates a time series waveform of current ID2 flowing through the diode D2.

Upon discharge of the capacitors C2 and C3 starting during period A (first period), in which the switching element Q1 is in the turned-on state and switching element Q2 is in the turned-off state, current starts to flow along the first current path and the third current path, and thus current starts to flow in the inductor L2 and the diode D2 (time T0 in sections (a) to (c) of FIG. 11). Once current starts to flow in the inductor L2 and the diode D2, the aforementioned current gradually increases during period A (period A between times T0 and T1 in sections (a) to (c) of FIG. 11).

Upon the switching element Q1 being subsequently turned off, current starts to flow along the current path A and the current path B in accompaniment to discharge of magnetic energy accumulated in the inductor L2, and current flowing in the inductor L2 starts to decrease (period B between times T1 and T2 in sections (a) to (c) of FIG. 11). Upon the switching element Q2 being subsequently turned on, current flows along the second current path and the fourth current path until charging of the capacitor C2 is complete (period C between times T2 and T3 in sections (a) to (c) of FIG. 11). Once charging of the capacitor C2 is complete, current continues to flow along the fourth current path until discharge of magnetic energy accumulated in the inductor L2 is complete (period C between times T3 and T4 in sections (a) to (c) of FIG. 11).

Upon completion of charging of the capacitor C3, discharge from the capacitor C3 starts soon thereafter causing current flowing along the fifth current path to gradually increase. As a result, current flows in an opposite direction to during the period between times T3 and T4 through the inductor L2 (period C between times T4 and T5 in sections (a) to (c) of FIG. 11). During the above, magnetic energy accumulates in the inductor L2.

Upon the switching element Q2 being subsequently turned off, current starts to flow along the current path C and current flowing through the inductor L2 starts to decrease (period D between times T5 and T6 in sections (a) to (c) of FIG. 11). Upon the switching element Q1 being subsequently turned on, current flows along the sixth current path until charging of the capacitor C3 is once again complete (period A between times T6 and T7 in sections (a) to (c) of FIG. 11).

Upon completion of charging of the capacitor C3, discharge of the capacitors C2 and C3 starts soon thereafter causing current to once again start flowing along the first current path and the third current path, and thus also causing current to start flowing through the inductor L2 and the diode D2.

The phenomenon described above is repeated. Therefore, a period during which current ID2 flows through the diode D2 and a period during which current ID2 is cut-off are alternately repeated. The period during which current ID2 flows through the diode D2 is in other words period Ti (herein, referred to as a current flow period) during which current flows from the output terminal at the high-potential side of the rectifier circuit 2 to the inductor L2. The period during which current ID2 is cut-off is in other words period Ts during which flow of current from the output terminal at the high-potential side of the rectifier circuit 2 to the inductor L2 is cut-off.

Length of the period Ti, during which current ID2 flows through the diode D2, changes in accordance with instantaneous magnitude of output voltage Vin from the rectifier circuit 2.

Figure 12:
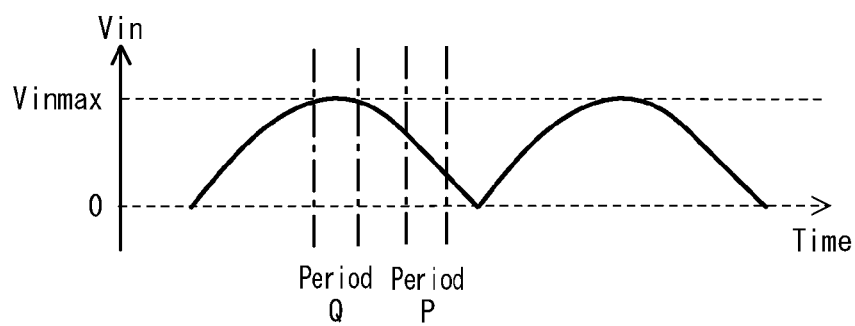
FIG. 12 illustrates, for the DC power supply circuit relating to the second embodiment, a time series waveform of output voltage of a rectifier circuit in section (a), a time series waveform of current flowing through the inductor during period P in section (b-1), a time series waveform of current flowing through the diode during period P in section (b-2), a time series waveform of current flowing through the inductor during period Q in section (c-1), and a time series waveform of current flowing through the diode during period Q in section (c-2).
Figure 12:
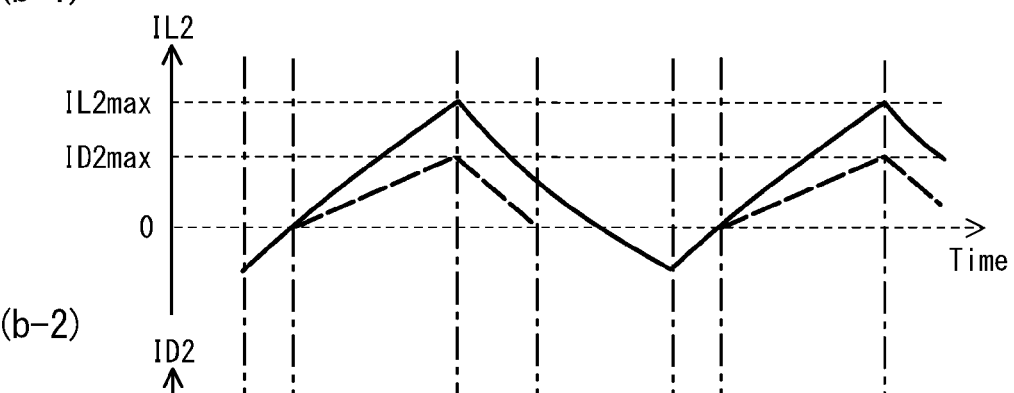
Figure 12:
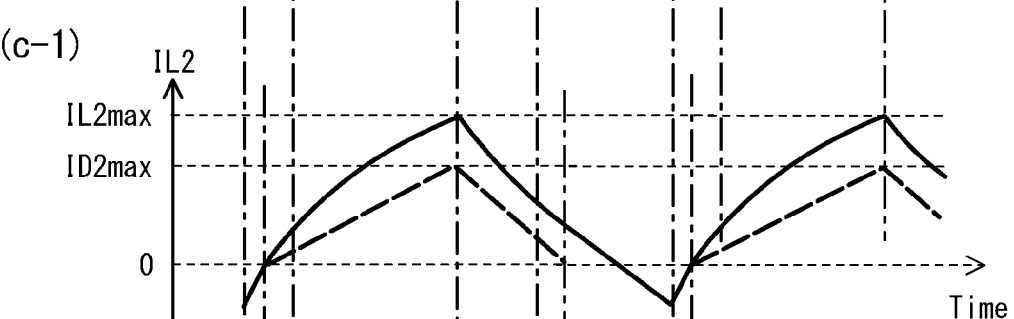
Figure 12:
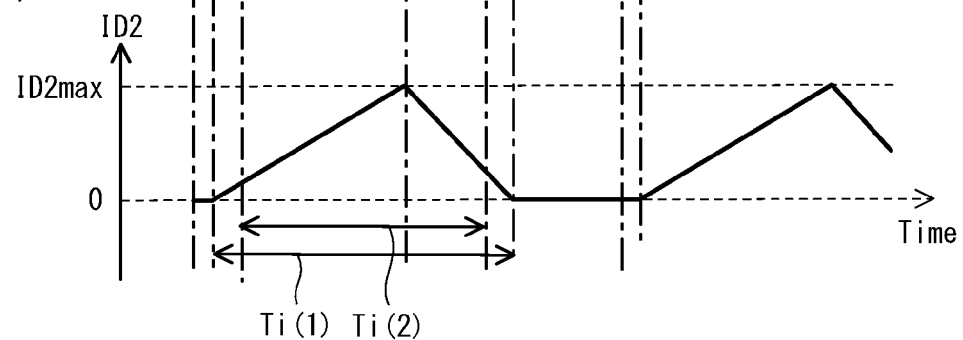

In FIG. 12, section (a) illustrates a time series waveform of instantaneous magnitude of output voltage Vin from the rectifier circuit 2, sections (b-1) and (b-2) respectively illustrate time series waveforms of current IL2 and current ID2 flowing respectively through the inductor L2 and the diode D2 during period P illustrated in section (a), and sections (c-1) and (c-2) respectively illustrate time series waveforms of current IL2 and current ID2 respectively flowing through the inductor L2 and the diode D2 during period Q illustrated in section (a). Note that in section (a) of FIG. 12, instantaneous magnitude of output voltage Vin from the rectifier circuit 2 is greater during period Q than during period P.

Upon comparison of sections (b-1) and (b-2) of FIG. 12 with sections (c-1) and (c-2) of FIG. 12, it can be seen that a current flow period Ti (1) occurring during period Q is longer than a current flow period Ti (2) occurring during period P. Furthermore, a maximum value ID2max of current ID2 flowing through the diode D2 is greater during period Q than during period P. The above is also reflected in the fact that a maximum value IL2max of current IL2 flowing through the inductor L2 is greater during period Q than during period P.

Note that a single cycle of on-off operation of the switching elements Q1 and Q2, and an on-duty proportion of each of the switching elements Q1 and Q2, are set such that a ratio of average values of the aforementioned current flow periods during the single cycle is greater than 0.65. The above ensures that a ratio of sum totals of the current flow periods, during a half cycle of AC output from the power supply AC, is greater than 0.65.

Figure 13:
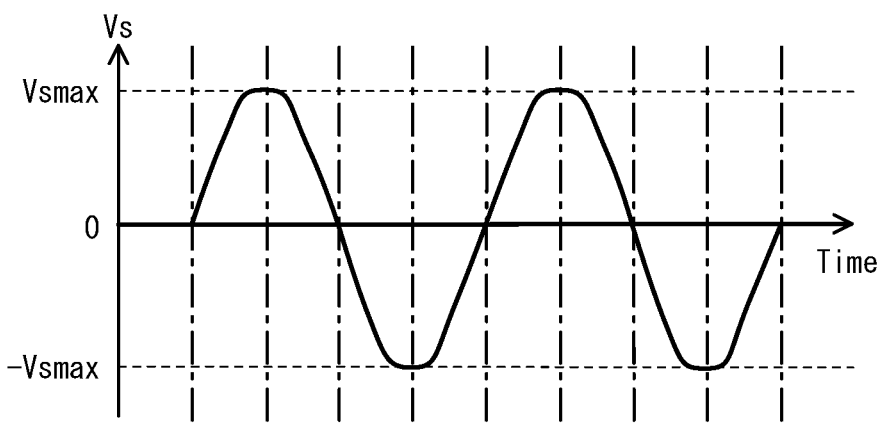
FIG. 13 illustrates, for the DC power supply circuit relating to the second embodiment, a time series waveform of input voltage to the rectifier circuit from an AC power supply in section (a), a time series waveform of output voltage from the rectifier circuit in section (b), a time series waveform of current flowing through the diode in section (c), and a time series waveform of current flowing from the AC power supply to the rectifier circuit in section (d).
Figure 13:
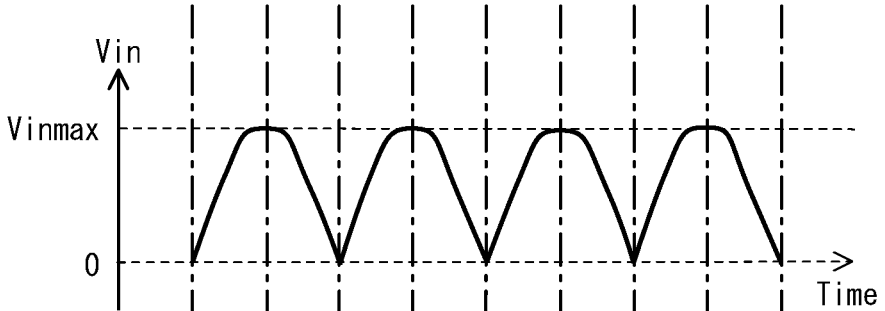
Figure 13:
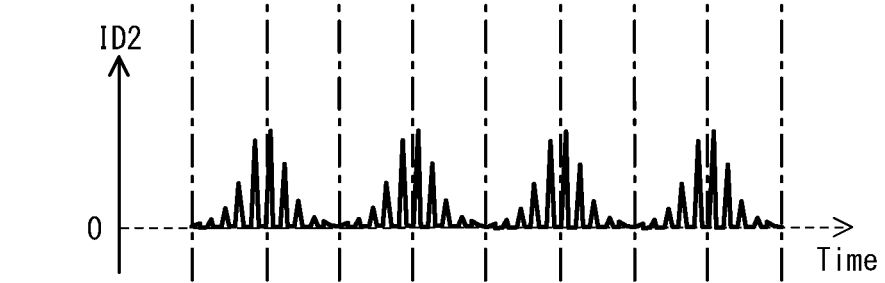
Figure 13:
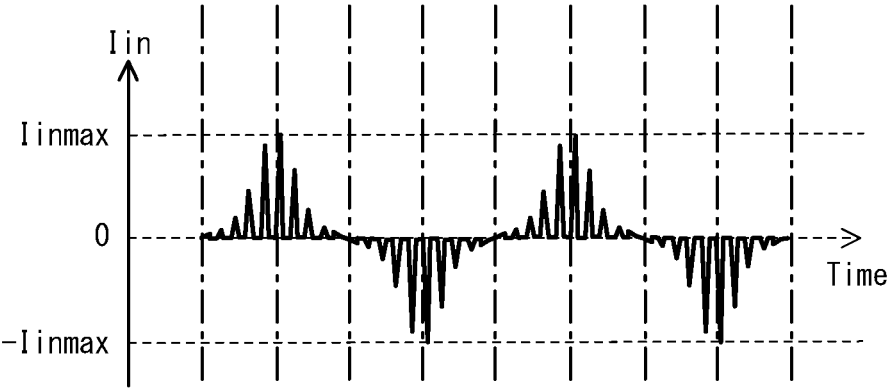

In FIG. 13, section (a) illustrates, for the DC power supply circuit 2001, a time series waveform of input voltage Vs to the rectifier circuit 2 from the power supply AC, section (b) illustrates a time series waveform of output voltage Vin from the rectifier circuit 2, section (c) illustrates a time series waveform of current ID2 flowing through the diode D2, and section (d) illustrates a time series waveform of input current Iin to the rectifier circuit 2 from the power supply AC.

As illustrated in sections (a) and (b) of FIG. 13, the time series waveform of input voltage Vs to the rectifier circuit 2 from the power supply AC is sinusoidal, whereas the time series waveform of output voltage Vin from the rectifier circuit 2 has a pulsating shape, maximums of which occur at times coinciding with maximums of absolute value of input voltage Vs to the rectifier circuit 2 from the power supply AC.

As illustrated in section (c) of FIG. 13, the time series waveform of current ID2 flowing through the diode D2 has saw-blade shape which is synchronized with on-off operation of the switching elements Q1 and Q2. An envelope around the time series waveform of the current ID2 increases in accordance with increasing instantaneous magnitude of output voltage Vin from the rectifier circuit 2.

Input current Iin to the rectifier circuit 2 from the power supply AC is approximately proportional to current ID2 flowing through the diode D2. An increase in instantaneous magnitude of output voltage Vin from the rectifier circuit 2 corresponds to an increase in absolute value of the envelope around the time series waveform of current ID2 flowing through the diode D2. As illustrated in section (d) of FIG. 13, absolute value of an envelope around the time series waveform of current Iin, flowing from the power supply AC to the rectifier circuit 2, mirrors absolute value of the envelope around the time series waveform of the current ID2 flowing through the diode D2.

In the DC power supply circuit 2001, current Iin continues to flow intermittently from the power supply AC to the rectifier circuit 2 throughout the entirety of each cycle of output voltage Vs of the power supply AC. In other words, current Iin flows intermittently, in synchronization with on-off operation of the switching elements Q1 and Q2, from the power supply AC to the voltage conversion circuit 2003, via the rectifier circuit 2. Through appropriate setting of cycles of on-off operation of the switching elements Q1 and Q2, inductance of the inductor L2, and electrostatic capacitance of the capacitors C2 and C3, a sum total of periods, during a single cycle of AC, in which current Iin flows from the power supply AC to the voltage conversion circuit 2003, via the rectifier circuit 2, can be increased to greater than a half cycle of the AC, thereby enabling power factor improvement.

Note that electrical charge which is charged in the capacitor C2 is supplied to the load 11 along the third current path. Consequently, the DC power supply circuit 2001 enables circuit efficiency improvement in accordance with an amount of discharge current which is supplied to the load 11 from the capacitor C2. Charging of the capacitor C2 is repeated upon each repetition of period C, in which the switching element Q1 is in the turned-off state and the switching element Q2 is in the turned-on state, thus maintaining an approximately constant voltage across terminals of the capacitor C2. The above enables suppression of variation in magnitude of current supplied to the load 11 from the capacitor C2.

To summarize, in the DC power supply circuit 2001 relating to the present embodiment, when the switching element Q1 is in the turned-on state and the switching element Q2 is in the turned-off state, current flows along the first current path from the output terminal at the high-potential side of the rectifier circuit 2 to the output terminal at the low-potential side of the rectifier circuit 2 and when the switching element Q1 is in the turned-off state and the switching element Q2 is in the turned-on state, current flows along the second current path from the output terminal at the high-potential side of the rectifier circuit 2 to the output terminal at the low-potential side of the rectifier circuit 2. The switching elements Q1 and Q2 are operated such that period A (first period) and period C (second period) are alternately repeated a plurality of times during each half cycle of AC. As a result, current continues to flow from the rectifier circuit 2 to the voltage conversion circuit 2003 substantially throughout the entire half cycle of AC, thus improving power factor relative to the power supply AC.

Furthermore, while the switching element Q1 is in the turned-on state and the switching element Q2 is in the turned-off state, current is supplied from the second terminal of the capacitor C2 to the load 11 along the third current path, and while the switching element Q1 is in the turned-off state and the switching element Q2 is in the turned-on state, current is supplied from the first terminal of the inductor L2 to the load 11 along the fourth current path. As a result of the configuration described above, current continues to flow through the load 11 regardless of on-off operation of the switching elements Q1 and Q2, thus enabling operation of the load 11 in a state in which only a small amount of variation occurs in current flowing therein.

Typically, a DC power supply circuit designed in order to improve power factor has a configuration in which a PFC circuit is connected to a rectifier circuit, and a voltage conversion circuit is connected downstream of the PFC circuit. The PFC includes elements such as a switching element, an inductor, and a control IC. In contrast, the DC power supply circuit 2001 relating to the present embodiment enables power factor improvement without inclusion of a separate PFC circuit. As a result, the DC power supply circuit 2001 relating to the present embodiment has advantageous effects of reduced circuit size and improved circuit efficiency through elimination of power loss occurring due to the PFC circuit. In particular, the DC power supply circuit 2001 is configured using common components such as the diode D2 and the diode bridge DB, and thus also has an advantageous effect of cost reduction. Furthermore, even when the load 11 requires a high voltage, LC resonance of the capacitors C3 and C4, and the inductor L2 increases and the operations described above can be maintained, thereby maintaining lighting of the load 11 in a state in which a high power factor is achieved. When the load 11 is a fixed voltage load such as an LED, a peak region of resonance voltage is automatically cut at fixed voltage VF of the load 11 such that resonance does not become excessively large. As a result of the configuration described above, necessity of including an excessive voltage protection circuit can be negated.

Modified Examples (1) As illustrated in FIG. 3, the first embodiment is explained for an example in which the drive circuit U1 operates the switching element Q1 in a mode in which periods occur during which current does not flow through the inductors L2 and L3 of the voltage conversion circuit 3 (i.e., a so called "discontinuous mode"), but the above is not a limitation. Alternatively the switching element Q1 may be operated in a so called "critical mode" or "continuous mode" in which current flows through the inductors L2 and L3 at all times. In such a situation, operation mode of the drive circuit U1 can simply be changed while retaining the same configuration as described for the DC power supply circuit 1 in the first embodiment.

Figure 14:
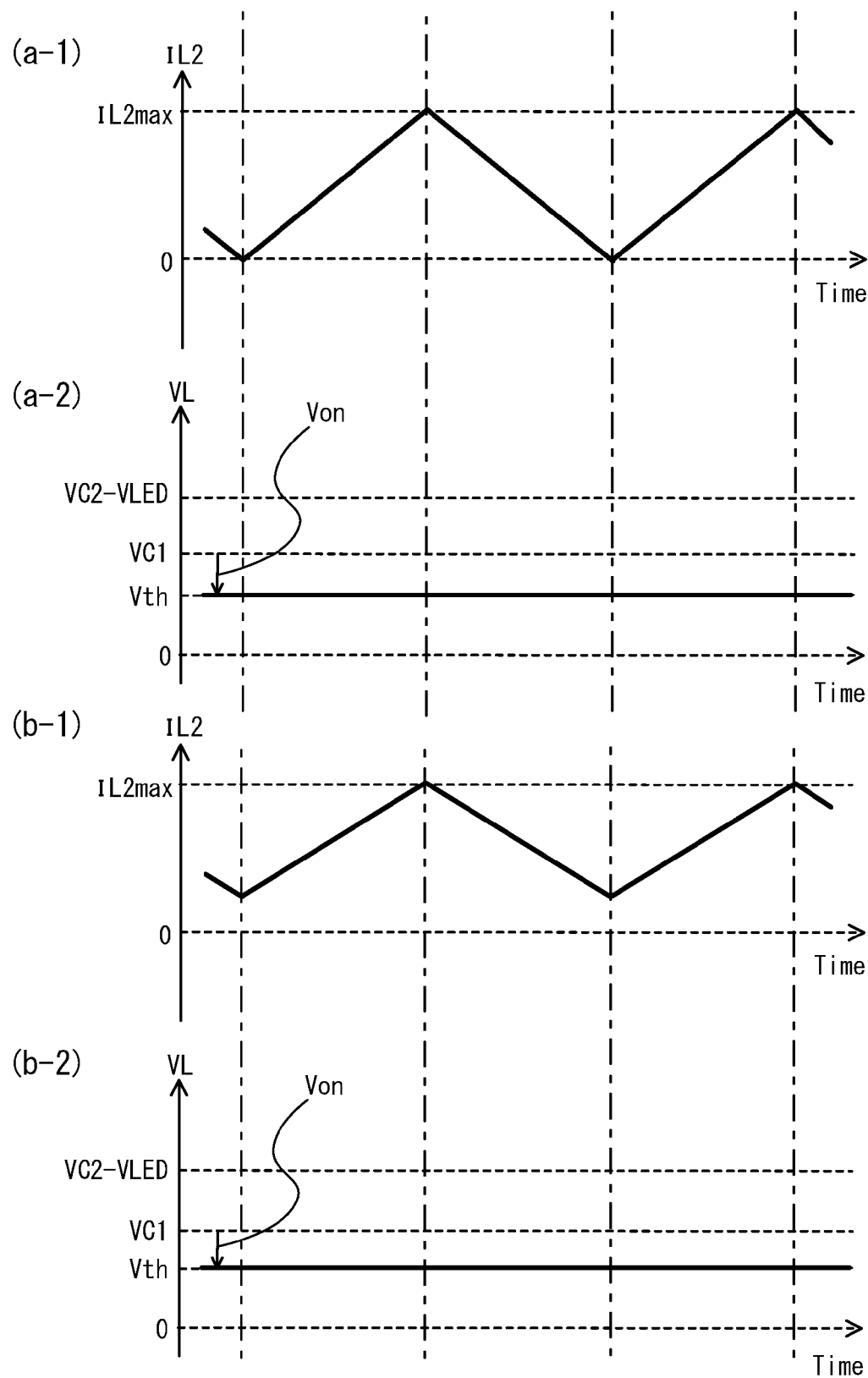
FIG. 14 illustrates, for a DC power supply circuit relating to a modified example, a time series waveform of current flowing through an inductor when operating in critical mode in section (a-1), a time series waveform of voltage arising at a node between two inductors when operating in critical mode in section (a-2), a time series waveform of current flowing through the inductor when operating in continuous mode in section (b-1), and a time series waveform of voltage arising at the node between the two inductors when operating in continuous mode in section (b-2).

In FIG. 14, section (a-1) illustrates, for a DC power supply circuit relating to the present modified example, a time series waveform of current IL2 flowing through the inductor L2 when the DC power supply circuit is operating in critical mode, and section (a-2) illustrates a time series waveform of voltage arising at the second terminal of the inductor L2 when the DC power supply circuit is operating in critical mode. Also, in FIG. 14, section (b-1) illustrates a time series waveform of current IL2 flowing through the inductor L2 when the DC power supply circuit is operating in continuous mode, and section (b-2) illustrates a time series waveform of voltage arising at the second terminal of the inductor L2 when the DC power supply circuit is operating in continuous mode.

As illustrated in sections (a-1), (a-2), (b-1), and (b-2) of FIG. 14, voltage arising at the second terminal of the inductor L2 can be maintained at voltage Vth in both critical mode and continuous mode.

Figure 15:
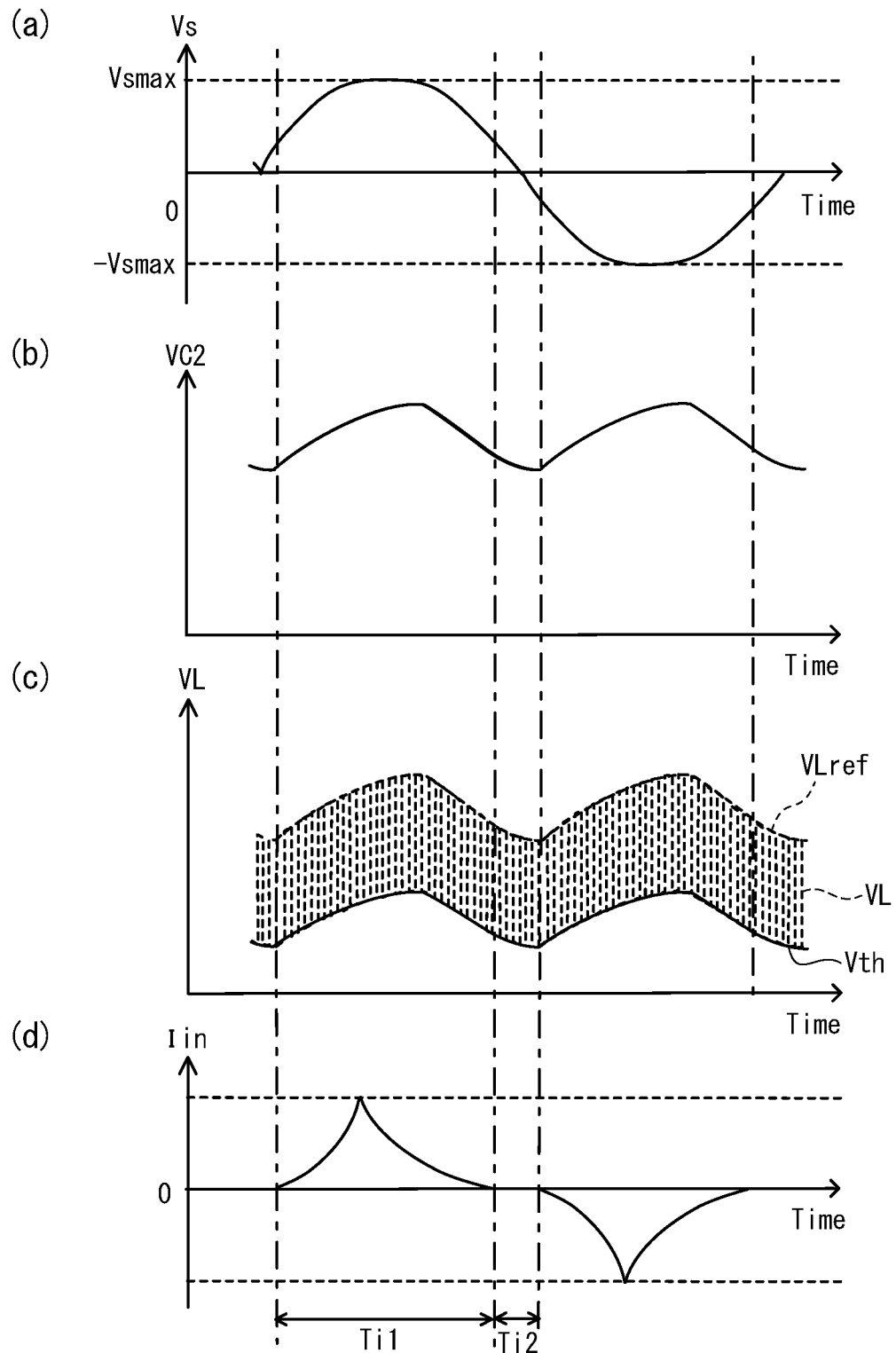
FIG. 15 illustrates, for a DC power supply circuit relating to a modified example, a time series waveform of input voltage to a rectifier circuit from an AC power supply in section (a), a time series waveform of voltage across terminals of a capacitor in section (b), a time series waveform of voltage at a node between inductors in section (c), and a time series waveform of current flowing from the AC power supply to the rectifier circuit in section (d).

In FIG. 15, section (a) illustrates, for the DC power supply circuit relating to the present modified example, a time series waveform of input voltage to the rectifier circuit 2 from the power supply AC, section (b) illustrates a time series waveform of voltage VC2 across terminals of the capacitor C2, section (c) illustrates a time series waveform of voltage VL of the second terminal of the inductor L2, and section (d) illustrates a time series waveform of current Iin flowing from the power supply AC to the rectifier circuit 2. In section (c) of FIG. 15, voltage VLref (dashed line) indicates a time series waveform when the drive circuit U1 is operated in discontinuous mode (refer to the first embodiment).

In particular, as illustrated in section (c) of FIG. 15, voltage VL of the second terminal of the inductor L2 is fixed as threshold voltage Vth. As a result, an amount of time that current Iin flows from the power supply AC to the rectifier circuit 2 during period Ti1 can be increased, and thus power factor can be improved in accordance with the aforementioned increase.

(2) The first embodiment is explained for an example in which the voltage conversion circuit 3 is a step-down chopper circuit, but the above is not a limitation. Alternatively, the voltage conversion circuit 3 may be a step-up/step-down chopper circuit.

Figure 16:
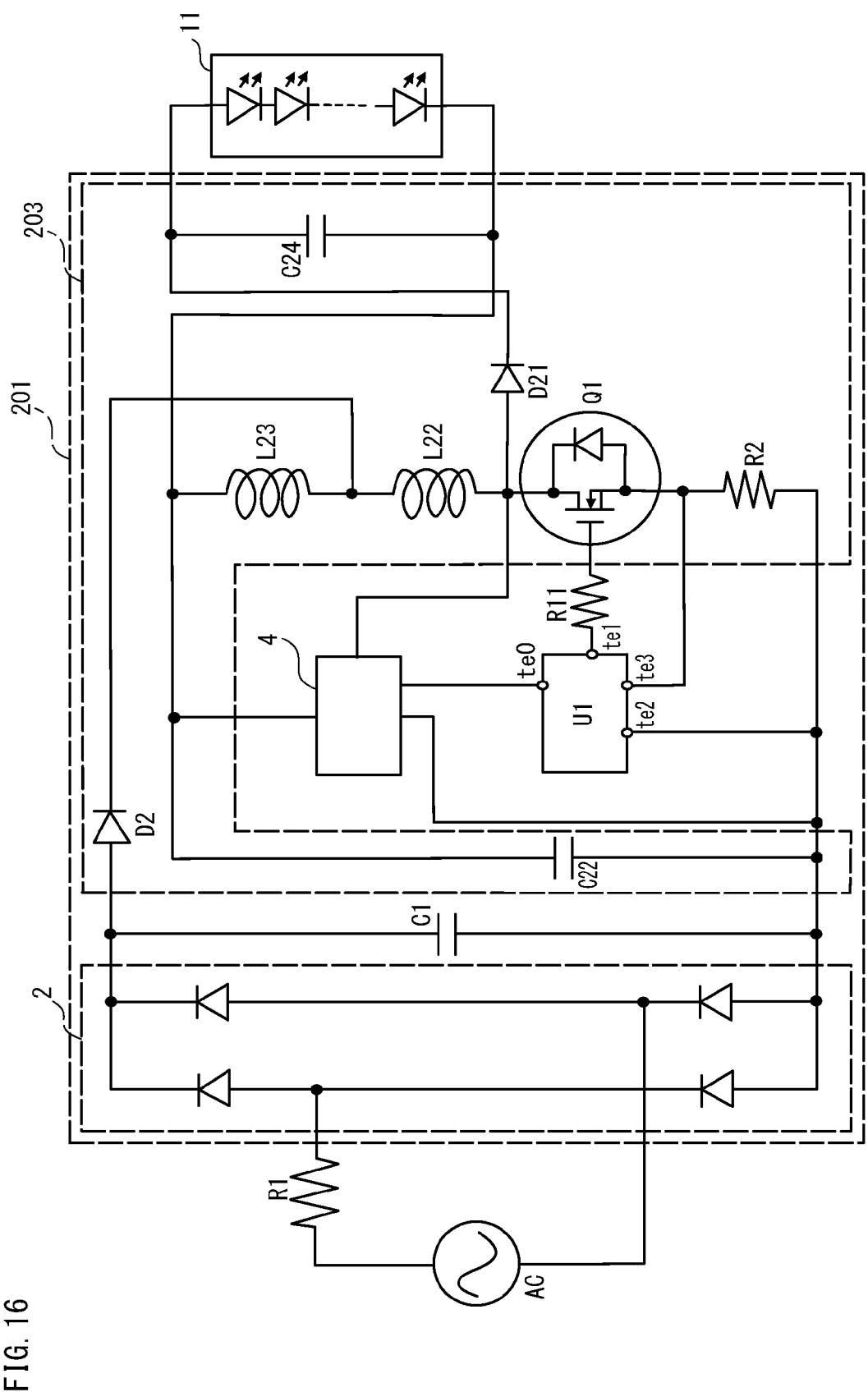
FIG. 16 is a circuit diagram illustrating a DC power supply circuit relating to a modified example.

FIG. 16 is a circuit diagram illustrating a DC power supply circuit 201 relating to the present modified example. Elements of configuration which are the same as in the embodiments are labeled using the same reference signs and explanation thereof is omitted where appropriate.

As illustrated in FIG. 16, voltage conversion circuit 203 is a step-up/step-down chopper circuit, and connection relationship of inductors L22 and L23, and diode D21 differs from the embodiments.

A first terminal of a capacitor C22 is connected to the output terminal at the low-potential side of the rectifier circuit 2. The inductors L22 and L23 are connected between the drain of the switching element Q1 and a second terminal of the capacitor C22. A first terminal of the inductor L22 is connected to the drain of the switching element Q1. A first terminal of the inductor L23 is connected to the second terminal of the capacitor C22 and a first terminal of the load 11, and a second terminal of the inductor L23 is connected to a second terminal of the inductor L22. An anode of the diode D21 is connected to a node between the first terminal of the inductor L22 and the drain of the switching element Q1, and a cathode of the diode D21 is connected to a second terminal of the load 11. In the same way as in the first embodiment, the anode of the diode D2 is connected to the output terminal at the high-potential side of the rectifier circuit 2 and the cathode of the diode D2 is connected to the second terminal of the inductor L22. The capacitor C24 is an electrolytic capacitor and is connected in parallel to the load 11.

The following explains operation of the DC power supply circuit 201 relating to the present modified example.

Figure 17A:
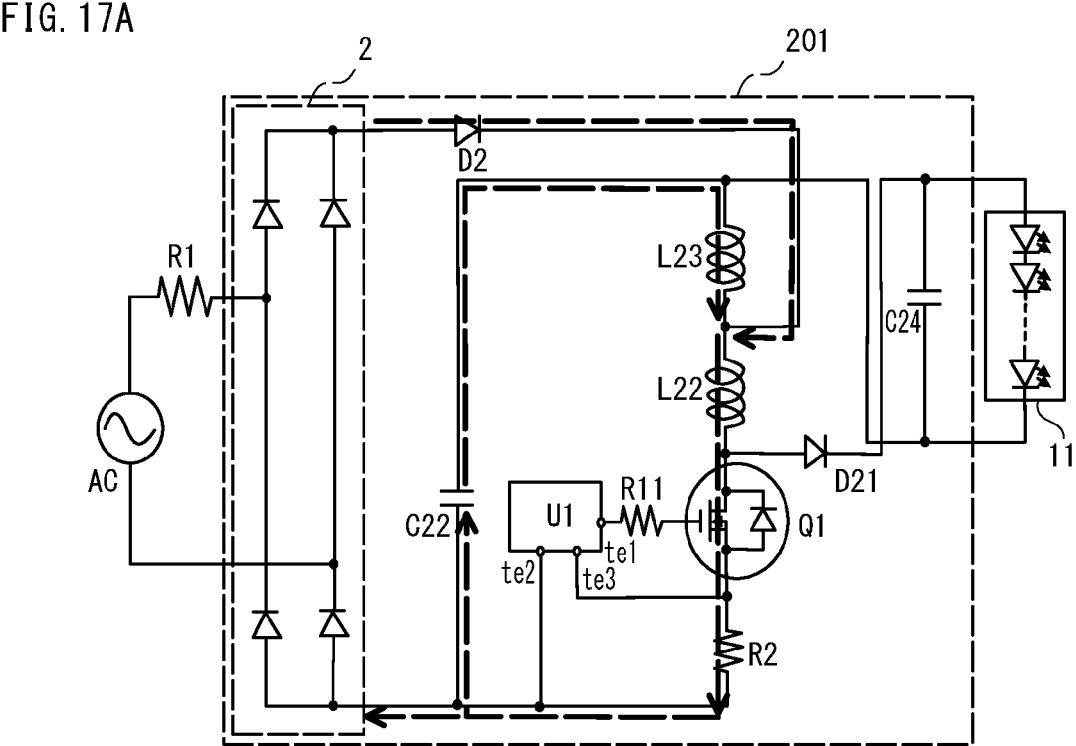
FIGS. 17A and 17B are circuit diagrams illustrating the DC power supply circuit relating to the modified example and flow of current in the DC power supply circuit.
Figure 17B:
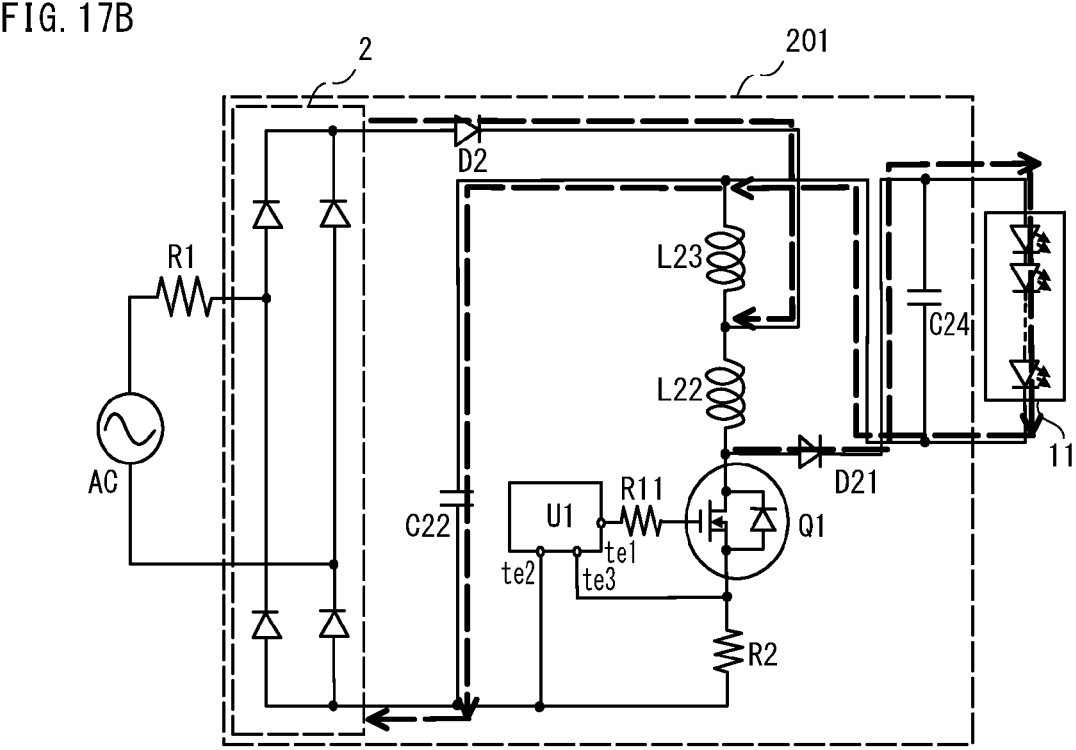

FIGS. 17A and 17B are circuit diagrams of the DC power supply circuit 201 relating to the present modified example, illustrating flow of current in the DC power supply circuit 201. Note that illustration of the fixed voltage circuit 4 is omitted in FIGS. 17A and 17B.

FIG. 17A illustrates flow of current when the switching element Q1 is in the turned-on state, and FIG. 17B illustrates flow of current when the switching element Q1 is in the turned-off state.

When the switching element Q1 is in the turned-on state, electric potential at the second terminal of the inductor L22 is lower than electric potential at the high-potential side of the rectifier circuit 2 by an amount equal to turn-on voltage of the diode D2. Consequently, as illustrated in FIG. 17A, current flows along a path (herein, referred to as a first current path) extending from the high-potential side of the rectifier circuit 2 to the output terminal at the low-potential side of the rectifier circuit 2, via the second terminal of the inductor L22, the switching element Q1, and the resistor R2 in respective order. At the same time, current flows along a path (herein, referred to as a third current path) extending from the second terminal of the capacitor C22 to the first terminal of the capacitor C22, via the inductor L23, the inductor L22, the switching element Q1, and the resistor R2 in respective order. During the above, the capacitor C22 discharges and magnetic energy accumulates in the inductors L22 and L23. Note that power is not supplied to the load 11 during the above.

On the other hand, as illustrated in FIG. 17B, when the switching element Q1 is in the turned-off state, current flows along a path (herein, referred to as a second current path) extending from the output terminal at the high-potential side of the rectifier circuit 2 to the output terminal at the low-potential side of the rectifier circuit 2, via the inductor L22, the diode D21, the load 11, and the capacitor C22 in respective order. At the same time, current flows along a path (herein, referred to as a fourth current path) extending from the first terminal of the inductor L22 to the first terminal of the inductor L23, via the diode D21 and the load 11 in respective order. Note that current does not flow along the second current path once charging of the capacitor C22 is complete. Also, magnetic energy accumulated in the inductors L22 and L23 is discharged toward the capacitor C22 and toward the load 11 due to current flowing along the fourth current path.

The DC power supply circuit 201 is configured such that voltage arising at the second terminal of the inductor L22 when current flows along the paths illustrated in FIG. 17A is equal to voltage arising at the second terminal of the inductor L22 when current flows along the paths illustrated in FIG. 17B. More specifically, an on-duty proportion of the switching element Q1 is set in the drive circuit U1 based on voltage across terminals of the load 11, number of turns in the inductors L22 and L23, and turn ratio of coils of the inductors L22 and L23. Furthermore, voltage arising at the second terminal of the inductor L22 is set such as to be lower than a threshold voltage, which is lower than output voltage from the rectifier circuit 2 by an amount equal to turn-on voltage Von of the diode D2. As a result, current continues to flow from the rectifier circuit 2 to the voltage conversion circuit 203, so long as current continues to flow through the inductors L22 and L23.

(3) The first embodiment is explained for an example in which the voltage conversion circuit 3 includes the two inductors L2 and L3, but the above is not a limitation. For example, in an alternative configuration the inductor L3 may be replaced by a diode.

Figure 18:
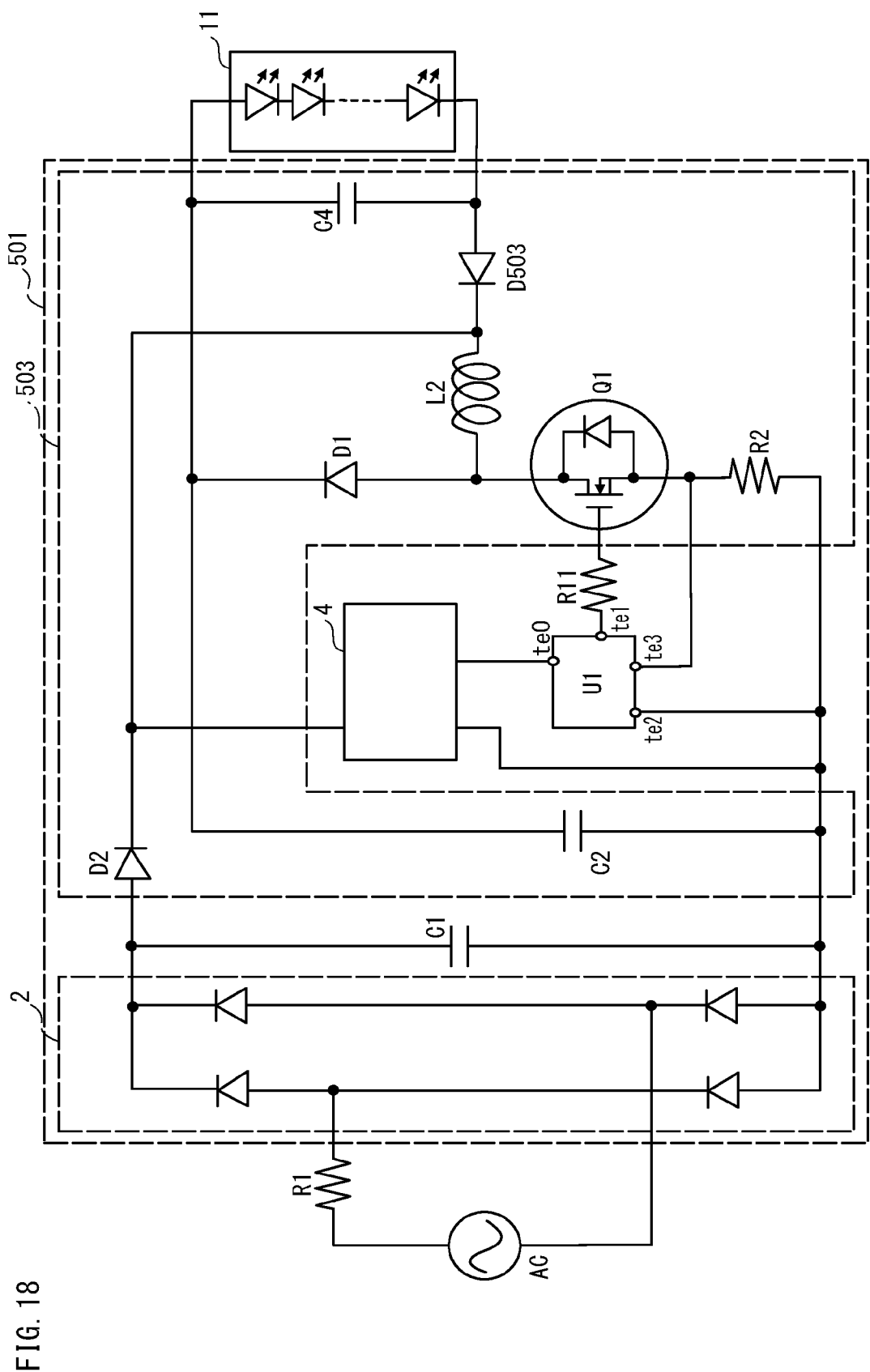
FIG. 18 is a circuit diagram illustrating a DC power supply circuit relating to a modified example.

FIG. 18 is a circuit diagram illustrating a DC power supply circuit 501 relating to the present modified example. Elements of configuration which are the same as in the embodiments are labeled using the same reference signs and explanation thereof is omitted where appropriate.

As illustrated in FIG. 18, voltage conversion circuit 503 is a step-up/step-down chopper circuit, and configuration also differs to the first embodiment in terms that the cathode of the diode D2 is connected to a node between the inductor L2 and a cathode of a diode D503.

The first terminal of the inductor L2 is connected to the drain of the switching element Q1 and the second terminal of the inductor L2 is connected to the cathode of the diode D503. An anode of the diode D503 is connected to the load 11. The anode of the diode D2 is connected to the output terminal at the high-potential side of the rectifier circuit 2 and the cathode of the diode D2 is connected to the node between the inductor L2 and the cathode of the diode D503. The diode D2 has a function of preventing reverse flow of current to the capacitor C1 from the node between the inductor L2 and the cathode of the diode D503. The first terminal of the capacitor C4 is connected to the cathode of the diode D1 and the second terminal of the capacitor C4 is connected to the anode of the diode D503.

The voltage conversion circuit 503 outputs a voltage across terminals of the capacitor C4 to the load 11, which is connected in parallel to the capacitor C4.

The capacitor C2 is for example an electrolytic capacitor, a high dielectric constant ceramic capacitor, or a film capacitor.

The following explains operation of the DC power supply circuit 501 relating to the present modified example.

Figure 19A:
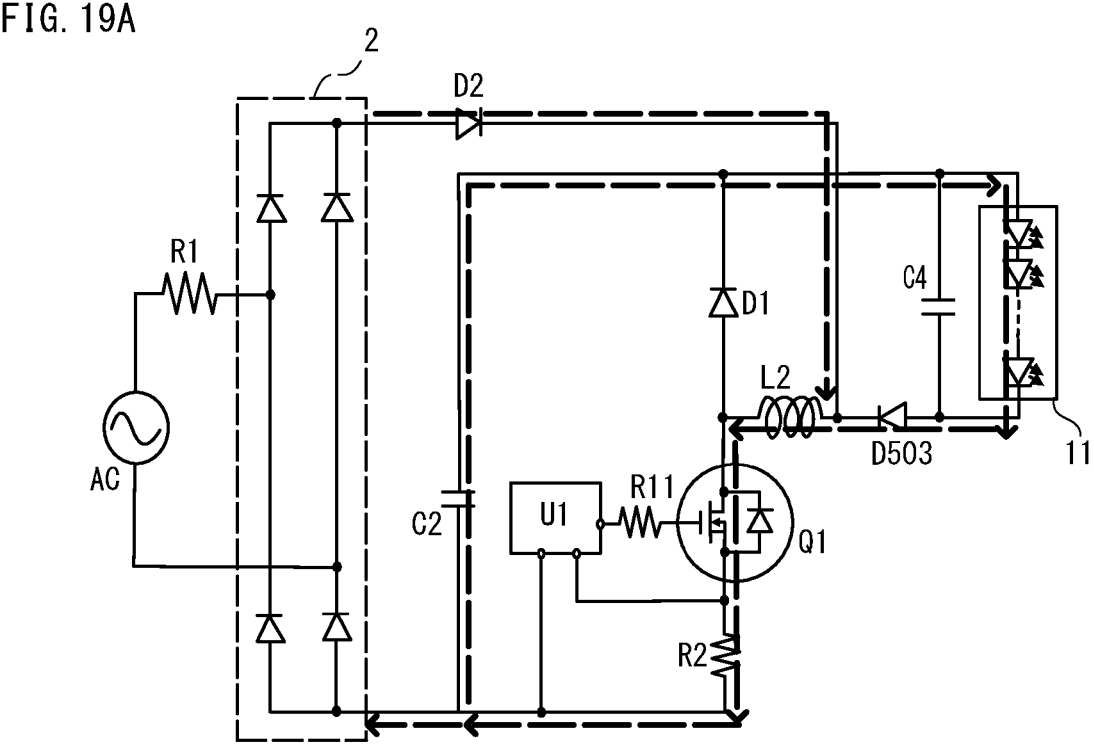
FIGS. 19A and 19B are circuit diagrams illustrating the DC power supply circuit relating to the modified example and flow of current in the DC power supply circuit.
Figure 19B:
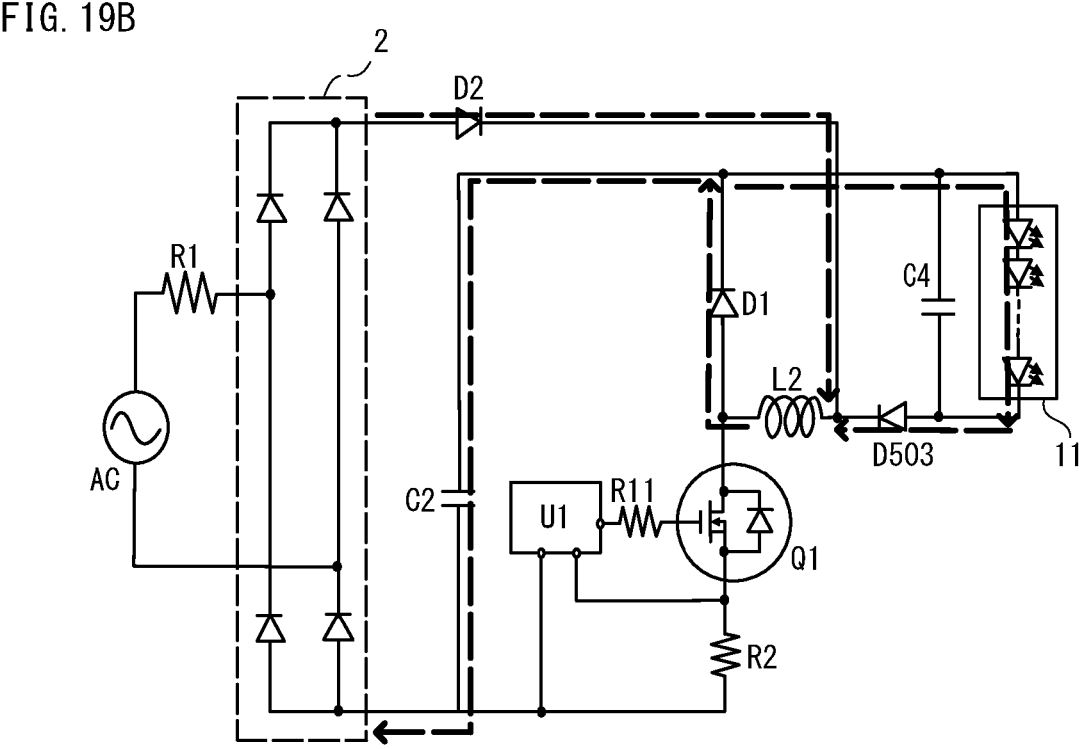

FIGS. 19A and 19B are circuit diagrams of the DC power supply circuit 501 relating to the present modified example, illustrating flow of current in the DC power supply circuit 501. Note that illustration of the fixed voltage circuit 4 is omitted in FIGS. 19A and 19B.

FIG. 19A illustrates flow of current when the switching element Q1 is in the turned-on state, and FIG. 19B illustrates flow of current when the switching element Q1 is in the turned-off state.

When the switching element Q1 is in the turned-on state, electric potential at the node between the inductor L2 and the cathode of the diode D503 is lower than electric potential at the high-potential side of the rectifier circuit 2 by an amount equal to turn-on voltage of the diode D2. Consequently, as illustrated in FIG. 19A, current flows along a path (herein, referred to as a first current path) extending from the output terminal at the high-potential side of the rectifier circuit 2 to the output terminal at the low-potential side of the rectifier circuit 2, via the inductor L2, the switching element Q1, and the resistor R2 in respective order. At the same time, current flows along a path (herein, referred to as a third current path) extending from the second terminal of the capacitor C2 to the first terminal of the capacitor C2, via the load 11, the diode D503, the inductor L2, the switching element Q1, and the resistor R2 in respective order. During the above, the capacitor C2 discharges, magnetic energy accumulates in the inductor L2, and power is supplied to the load 11 due to current flowing along the third current path.

On the other hand, as illustrated in FIG. 19B, when the switching element Q1 is in the turned-off state, current flows along a path (herein, referred to as a second current path) extending from the output terminal at the high-potential side of the rectifier circuit 2 to the output terminal at the low-potential side of the rectifier circuit 2, via the inductor L2, the diode D1, and the capacitor C2 in respective order. At the same time, current flows along a path (herein, referred to as a fourth current path) extending from the first terminal of the inductor L2 to the second terminal of the inductor L2, via the diode D1, the load 11, and the diode D503 in respective order. Note that current does not flow along the second current path once charging of the capacitor C2 is complete. Also, as a result of current flowing along the fourth current path, magnetic energy accumulated in the inductor L2 is discharged toward the load 11.

(4) The first embodiment is explained for an example in which the voltage conversion circuit 3 is a non-insulation type voltage conversion circuit such as a step-up chopper circuit, but the above is not a limitation. Alternatively, an insulation type voltage conversion circuit may be provided.

Figure 20:
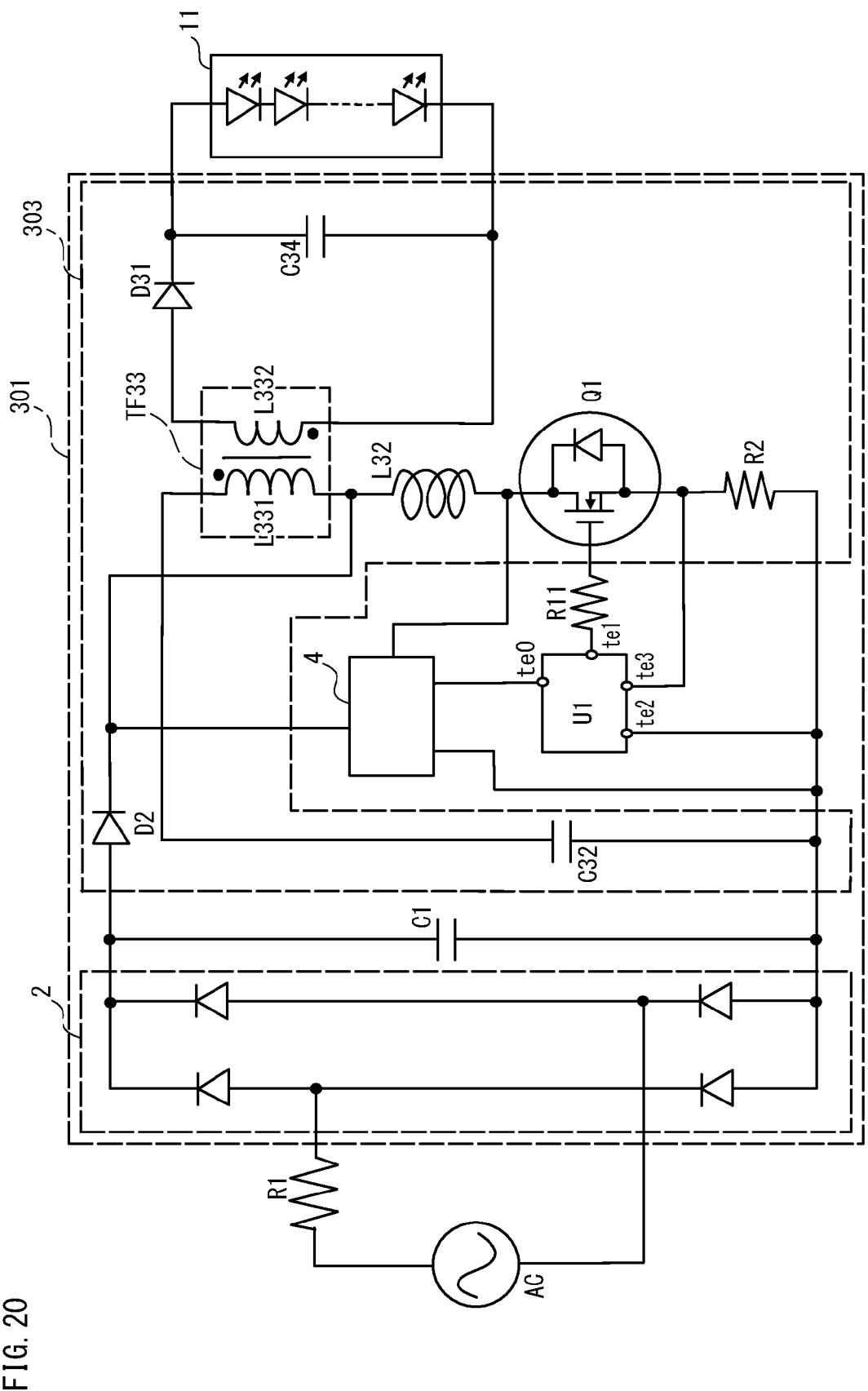
FIG. 20 is a circuit diagram illustrating a DC power supply circuit relating to a modified example.

FIG. 20 is a circuit diagram illustrating a DC power supply circuit 301 relating to the present modified example. Elements of configuration which are the same as in the embodiments are labeled using the same reference signs and explanation thereof is omitted where appropriate.

As illustrated in FIG. 20, voltage conversion circuit 303 is a flyback converter and includes a switching element Q1, an inductor L32, a transformer TF33 having a primary coil L331 and a secondary coil L332, diodes D2 and D31, capacitors C32 and C34, and a resistor R2. In the transformer TF33, polarity of the primary coil L331 is the opposite of polarity of the secondary coil L332. A source of the switching element Q1 is connected to the output terminal at the low-potential side of the rectifier circuit 2, via the resistor R2, a gate of the switching element Q1 is connected to the drive circuit U1, via the resistor R11, and a drain of the switching element Q1 is connected to a first terminal of the inductor L32. A second terminal of the inductor L32 is connected to a first terminal of the primary coil L331 of the transformer TF33. A second terminal of the primary coil L331 of the transformer TF33 is connected to the capacitor C32. A first terminal of the secondary coil L332 of the transformer TF33 is connected to the second terminal of the load 11, via the diode D31, and a second terminal of the secondary coil L332 is connected to the first terminal of the load 11. The capacitor C34 is connected in parallel to the load 11. The voltage conversion circuit 303 outputs voltage across terminals of the capacitor C34 to the load 11, which is connected in parallel to the capacitor C34.

Figure 21:
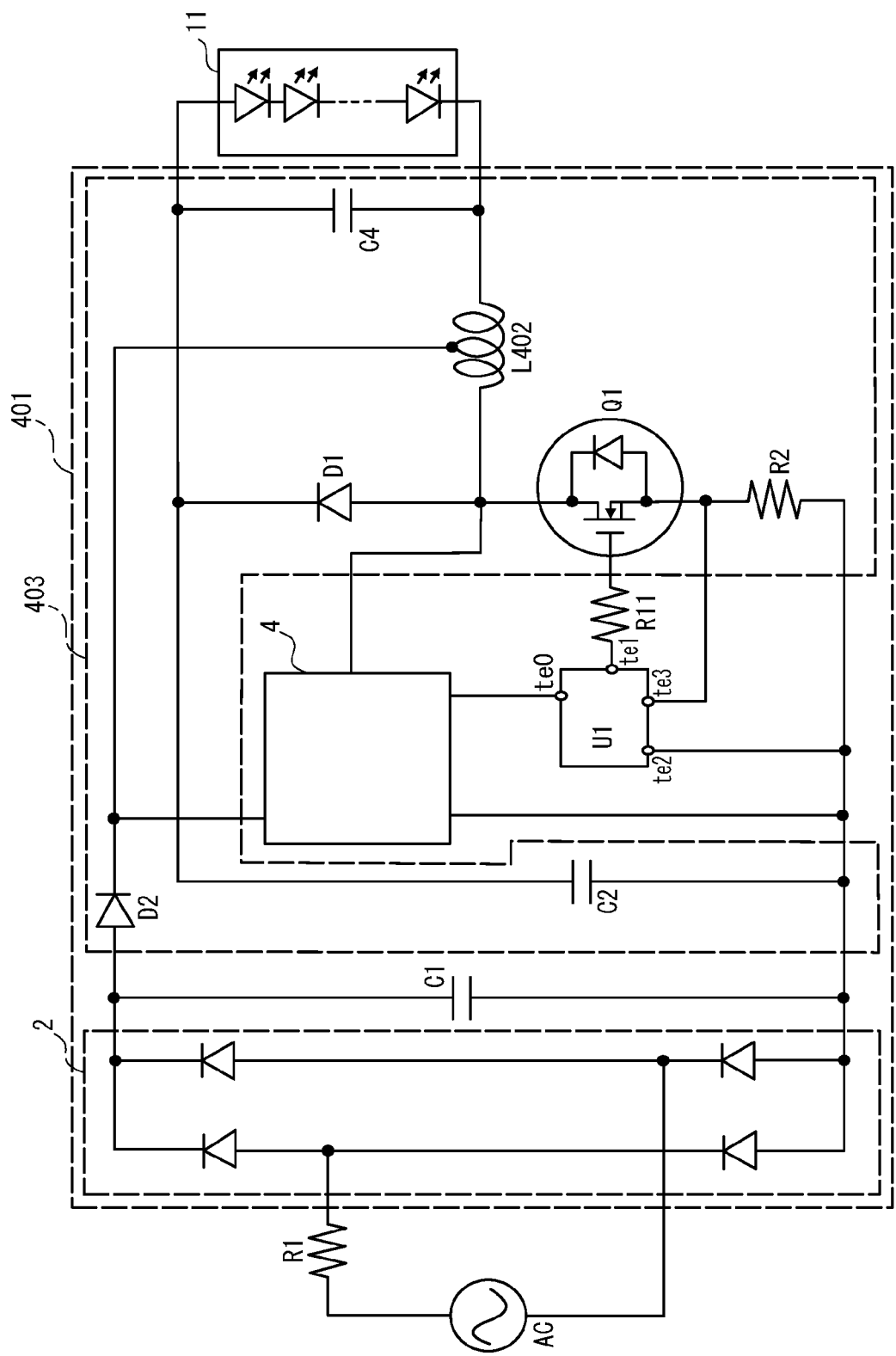
FIG. 21 is a circuit diagram illustrating a DC power supply circuit relating to a modified example.

(5) It is not essential that the inductors L2 and L3 explained in the first embodiment are separate elements, and alternatively the cathode of the diode D2 may be electrically connected to a point partway along a single coil. FIG. 21 is a circuit diagram illustrating a DC power supply circuit 401 relating to the present modified example.

As illustrated in FIG. 21, voltage conversion circuit 403 in the DC power supply circuit 401 includes an inductor L402 which has a center tap. The cathode of the diode D2 is connected to the center tap of the inductor L402.

In the configuration described above, magnitude of current flowing from the capacitor C1 to the inductor L402, via the center tap, can be adjusted by changing position of the center tap in the inductor L402.

The present configuration enables reduction in inductor size and thereby also enables reduction in size of the DC power supply circuit as a whole.

(6) The second embodiment is explained for an example in which the voltage conversion circuit 2003 includes the diode bridge DB, but the above is not a limitation.

Figure 22:
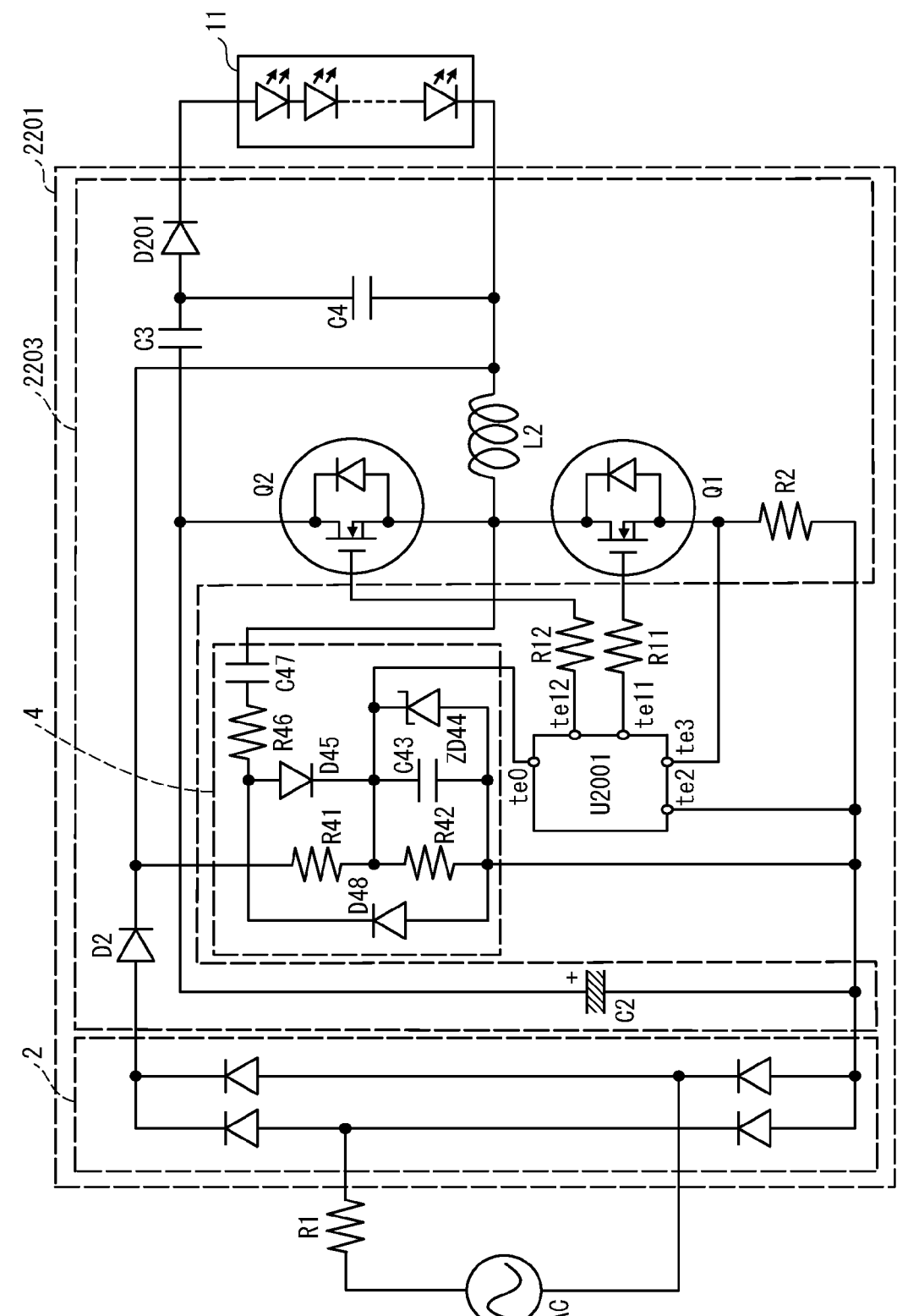
FIG. 22 is a circuit diagram illustrating a DC power supply circuit relating to a modified example.

FIG. 22 is a circuit diagram illustrating a DC power supply circuit 2201 relating to the present modified example. Elements of configuration which are the same as in the embodiments are labeled using the same reference signs and explanation thereof is omitted where appropriate.

In the DC power supply circuit 2201, voltage conversion circuit 2203 includes a diode D201. An anode of the diode D201 is connected to the second terminal of the capacitor C3 and a cathode of the diode D201 is connected to the inductor L2, via the load 11.

The configuration illustrated in FIG. 22 relating to the present modified example enables simplified circuit configuration and reduction in circuit size compared to the DC power supply circuit 2001 relating to the second embodiment.

Figure 23:
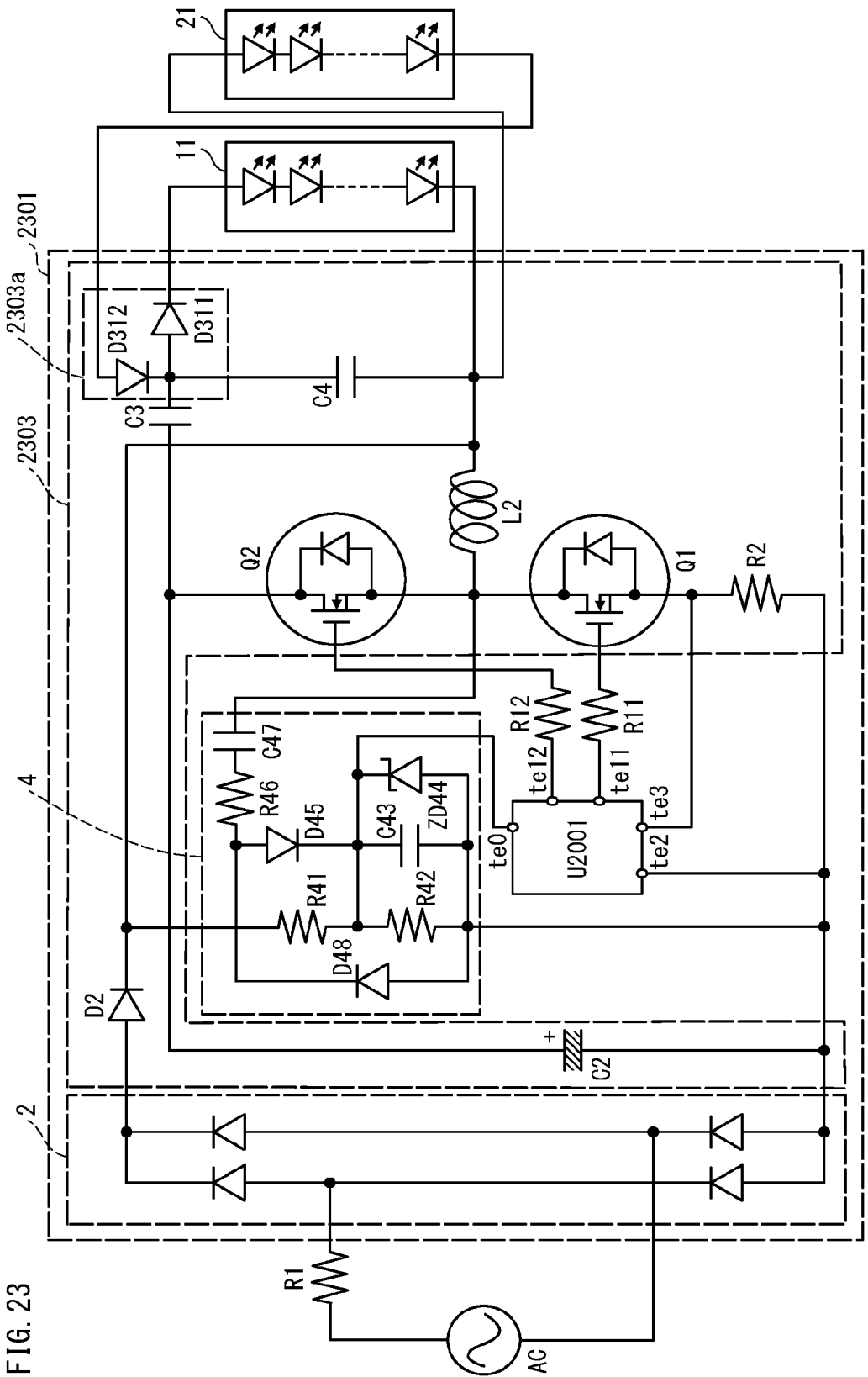
FIG. 23 is a circuit diagram illustrating a DC power supply circuit relating to a modified example.

FIG. 23 is a circuit diagram illustrating a DC power supply circuit 2301 relating to a different modified example. Elements of configuration which are the same as in the embodiments are labeled using the same reference signs and explanation thereof is omitted where appropriate.

In the DC power supply circuit 2301, voltage conversion circuit 2303 includes diodes D311 and D312. An anode of the diode D311 is connected to the second terminal of the capacitor C3 and a cathode of the diode D311 is connected to the inductor L2, via the load 11. An anode of the diode D312 is connected to the inductor L2, via a load 21, and a cathode of the diode D312 is connected to the second terminal of the capacitor C3. In the present modified example, the loads 11 and 21 are each a light-emitting module formed by a plurality of LEDs connected in series. Current is only conducted through the load 11 in a direction from the first terminal of the load 11, which is connected to the cathode of the diode D311, to the second terminal of the load 11, and current is only conducted through the load 21 in a direction from a first terminal of the load 21, which is connected to the cathode of the diode D312, to a second terminal of the load 21.

Through the configuration illustrated in FIG. 23 relating to the present modified example, a phase of current flowing through the load 11 and a phase of current flowing through the load 21 are shifted relative to one another by precisely a half cycle of the AC, causing the light-emitting module forming the load 11 and the light-emitting module forming the load 21 to repeatedly flash on and off in alternation with one other. As a consequence, light output by the light-emitting module forming the load 21 can be used to counterbalance fluctuations in light emitted from the light-emitting module forming the load 11, by forming a single light-emitting unit from the respective light-emitting modules forming the loads 11 and 21. An advantageous effect of such a configuration is that when the aforementioned light-emitting unit is viewed from a distance, fluctuations in light output from the light-emitting unit are not perceptible.

(7) The second embodiment was explained for an example in which the DC power supply circuit 2001 includes the drive circuit U2001, which is configured as a single integrated circuit, and the fixed voltage circuit 4, which supplies power to the drive circuit U2001, and in which the DC power supply circuit 2001 operates by a so called "separate excitation" method. However, the above is not a limitation, and alternatively the DC power supply circuit 2001 may operate by a so called "self excitation" method.

Figure 24:
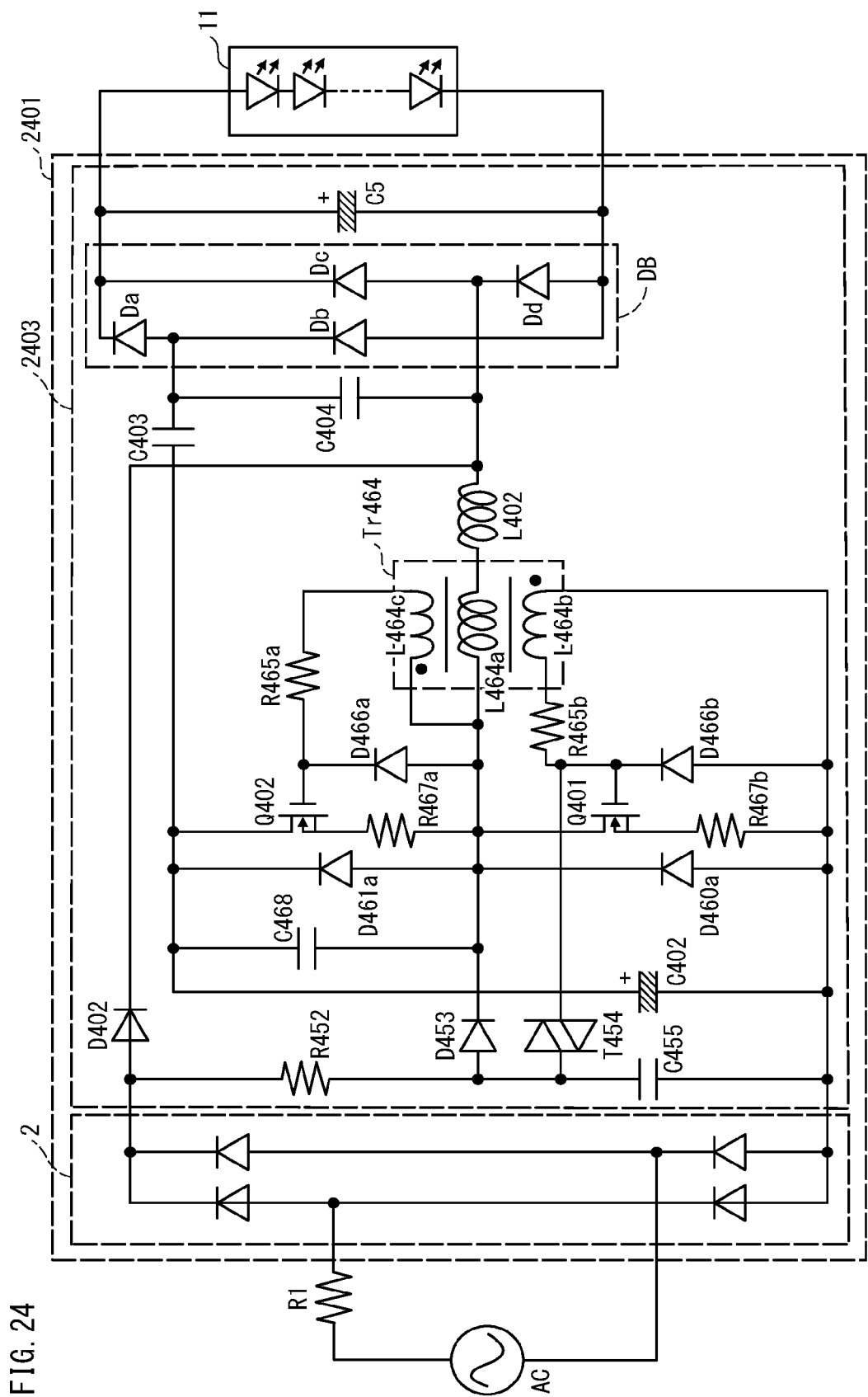
FIG. 24 is a circuit diagram illustrating a DC power supply circuit relating to a modified example.

FIG. 24 is a circuit diagram illustrating a DC power supply circuit 2401 relating to the present modified example. Elements of configuration which are the same as in the second embodiment are labeled using the same reference signs and explanation thereof is omitted where appropriate.

A voltage conversion circuit 2403 includes switching elements Q401 and Q402, an inductor L402, capacitors C5, C402, C403, C404 and C468, diodes D460a and D461a, and resistors R467a and R467b. The voltage conversion circuit 2403 also includes a transformer Tr464, diodes D453, D466a and D466b, a capacitor C455, resistors R452, R465a and R465b, and a triac T454.

The transformer Tr464 has a primary coil L464a, a secondary coil L464b, and a tertiary coil L464c. A first terminal of the primary coil L464a is connected to the inductor L402 and a second terminal of the primary coil L464a is connected to a first terminal of the secondary coil L464b. A first terminal of the tertiary coil L464c is connected to the output terminal at the low-potential side of the rectifier circuit 2.

A first terminal of the capacitor C402 is connected to the output terminal at the low-potential side of the rectifier circuit 2.

A first terminal of the capacitor C403 is connected to a second terminal of the capacitor C402 and a second terminal of the capacitor C403 is connected to a first input terminal of the diode bridge DB.

A first terminal of the inductor L402 is connected to the primary coil L464a of the transformer Tr464 and a second terminal of the inductor L402 is connected to a second input terminal of the diode bridge DB.

The switching element Q401 is an N-channel MOSFET. A source of the switching element Q401 is connected to the output terminal at the low-potential side of the rectifier circuit 2, via the resistor R467b, a gate of the switching element Q401 is connected to a second terminal of the tertiary coil L464c of the transformer Tr464, and a drain of the switching element Q401 is connected to the second terminal of the primary coil L464a. The switching element Q402 is also an N-channel MOSFET. A source of the switching element Q402 is connected to the second terminal of the primary coil L464a, via the resistor R467b, a gate of the switching element Q402 is connected to a second terminal of the secondary coil L464b, via the resistor R465a, and a drain of the switching element Q402 is connected to the capacitor C402.

An anode of the diode D460a is connected to the output terminal at the low-potential side of the rectifier circuit 2 and a cathode of the diode D460a is connected to the second terminal of the primary coil L464a.

An anode of the diode D461a is connected to the second terminal of the primary coil L464a and a cathode of the diode D461a is connected to the second terminal of the capacitor C402.

A first terminal of the capacitor C468 is connected to the second terminal of the primary coil L464a and a second terminal of the capacitor C468 is connected to the second terminal of the capacitor C402.

An anode of the diode D453 is connected to the output terminal at the high-potential side of the rectifier circuit 2, via the resistor R452, and a cathode of the diode D453 is connected to the second terminal of the primary coil L464a.

A first terminal of the capacitor C455 is connected to the output terminal at the low-potential side of the rectifier circuit 2 and a second terminal of the capacitor C455 is connected to the anode of the diode D453.

The triac T454 is connected between the second terminal of the capacitor C455 and the gate of the switching element Q401.

An anode of the diode D466a is connected to the second terminal of the primary coil L464a and a cathode of the diode D466a is connected to the gate of the switching element Q402.

An anode of the diode D466b is connected to the output terminal at the low-potential side of the rectifier circuit 2 and a cathode of the diode D466b is connected to the gate of the switching element Q401.

A first terminal of the capacitor C404 is connected to the second terminal of the capacitor C403 and a second terminal of the capacitor C404 is connected to the second terminal of the inductor L402. The capacitor C404 has a function of smoothing input voltage to the diode bridge DB.

In the DC power supply circuit 2401 relating to the present modified example, configuration elements such as the fixed voltage circuit 4 are not required, enabling simplification of circuit configuration.

(8) The second embodiment is explained for an example in which the capacitors C43 and C47 are charged at the same time as discharge of magnetic energy from the inductor L2 during a period in which the switching element Q1 is in the turned-off state and the switching element Q2 is in the turned-on state. Also, the capacitor C47 discharges during a period in which the switching element Q1 is in the turned-on state and the switching element Q2 is in the turned-off state, thereby causing electrical charge accumulated in the capacitor C47 to be transferred to the capacitor C43. However, the configuration described above is not a limitation. For example, alternatively a transformer may be included instead of the inductor L2 such that current flows from a secondary coil of the transformer to the fixed voltage circuit (i.e., charging the fixed voltage circuit).

Figure 25:
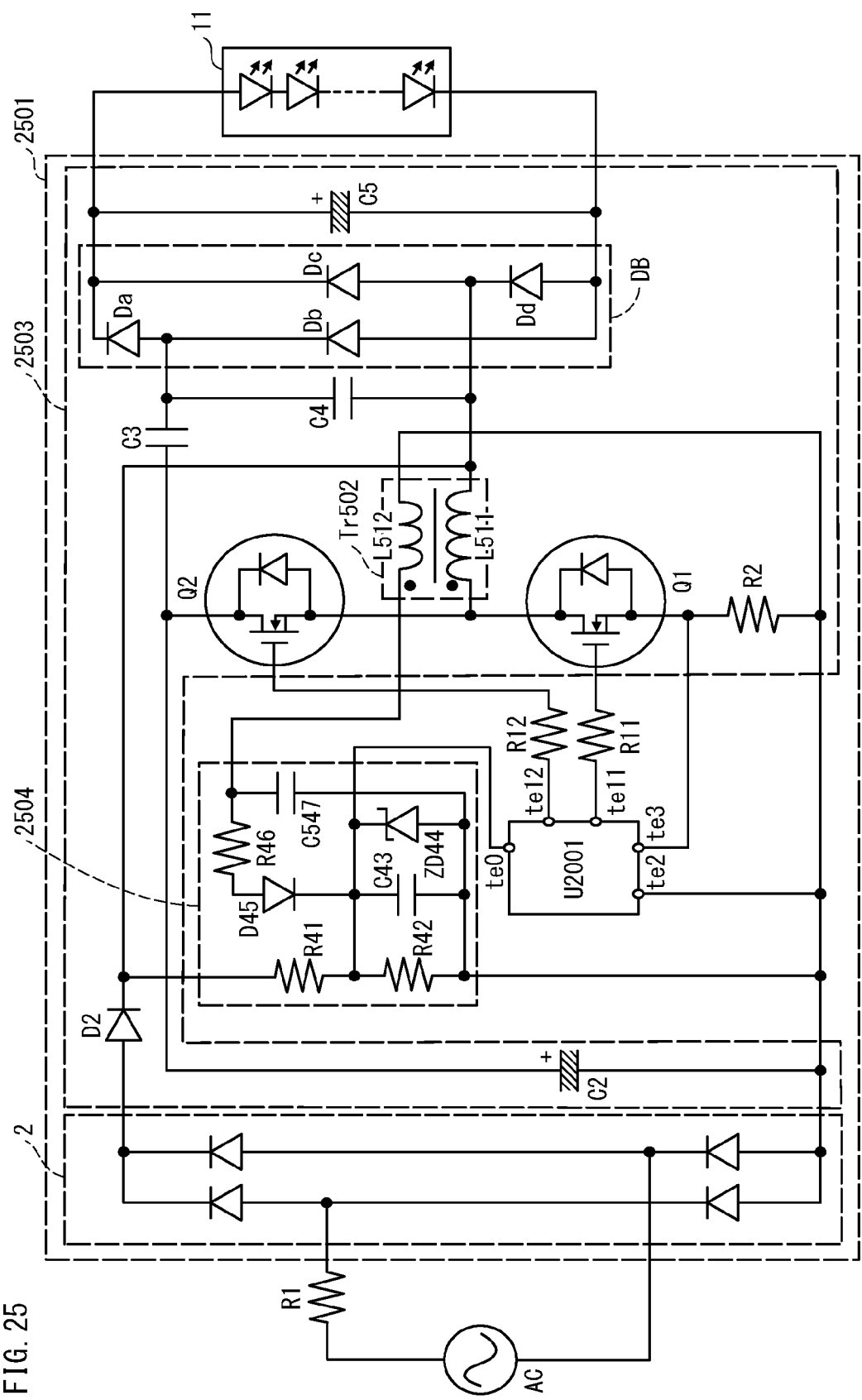
FIG. 25 is a circuit diagram illustrating a DC power supply circuit relating to a modified example.

FIG. 25 is a circuit diagram illustrating a DC power supply circuit 2501 relating to the present modified example. Elements of configuration which are the same as in the second embodiment are labeled using the same reference signs and explanation thereof is omitted where appropriate.

In the DC power supply circuit 2501, voltage conversion circuit 2503 includes a transformer Tr502 which has a primary coil L511 and a secondary coil L512. In the transformer Tr502, polarity of the primary coil L511 is the same as polarity of the secondary coil L512. Fixed voltage circuit 2504 includes a capacitor C547 which is connected between the output terminal at the low-potential side of the rectifier circuit 2 and a node between the resistor R46 and the secondary coil L512 of the transformer Tr502. The capacitor C547 functions as a so called "snubber capacitor" with respect to the secondary coil L512. According to the present modified example, during a period in which the switching element Q1 is in the turned-off state and the switching element Q2 is in the turned-on state, current is supplied from the secondary coil L512 to the fixed voltage circuit 2504 at the same time as magnetic energy is discharged from the primary coil L511. More specifically, current flows from the secondary coil L512 to the capacitor C43, via the resistor R46 and the diode D45, thereby causing charging of the capacitor C43. Note that in an alternative configuration the capacitor C547 may be omitted.

Note that configuration of the DC power supply circuit 2501 illustrated in FIG. 25 is explained for an example in which, in the transformer Tr502, polarity of the primary coil L511 is the same as polarity of the secondary coil L512, but alternatively polarity of the primary coil L511 may be the opposite of polarity of the secondary coil L512. In such a configuration, during a period in which the switching element Q1 is in the turned-on state and the switching element Q2 is in the turned-off state, current is supplied from the secondary coil L512 to the fixed voltage circuit 2504 at the same time as magnetic energy is accumulated in the primary coil L511.

Note that the configuration illustrated in FIG. 25 relating to the modified example is explained for an example in which current is supplied from the secondary coil L512 to the fixed voltage circuit 2504 at the same time as magnetic energy is discharged from the primary coil L511 or at the same time as magnetic energy is accumulated in the primary coil L511, but the above configuration is not a limitation. Alternatively, current may be supplied from the secondary coil L512 to the fixed voltage circuit 2504 at the same time as magnetic energy is discharged from the primary coil L511 and also at the same time as magnetic energy is accumulated in the primary coil L511.

Figure 26:
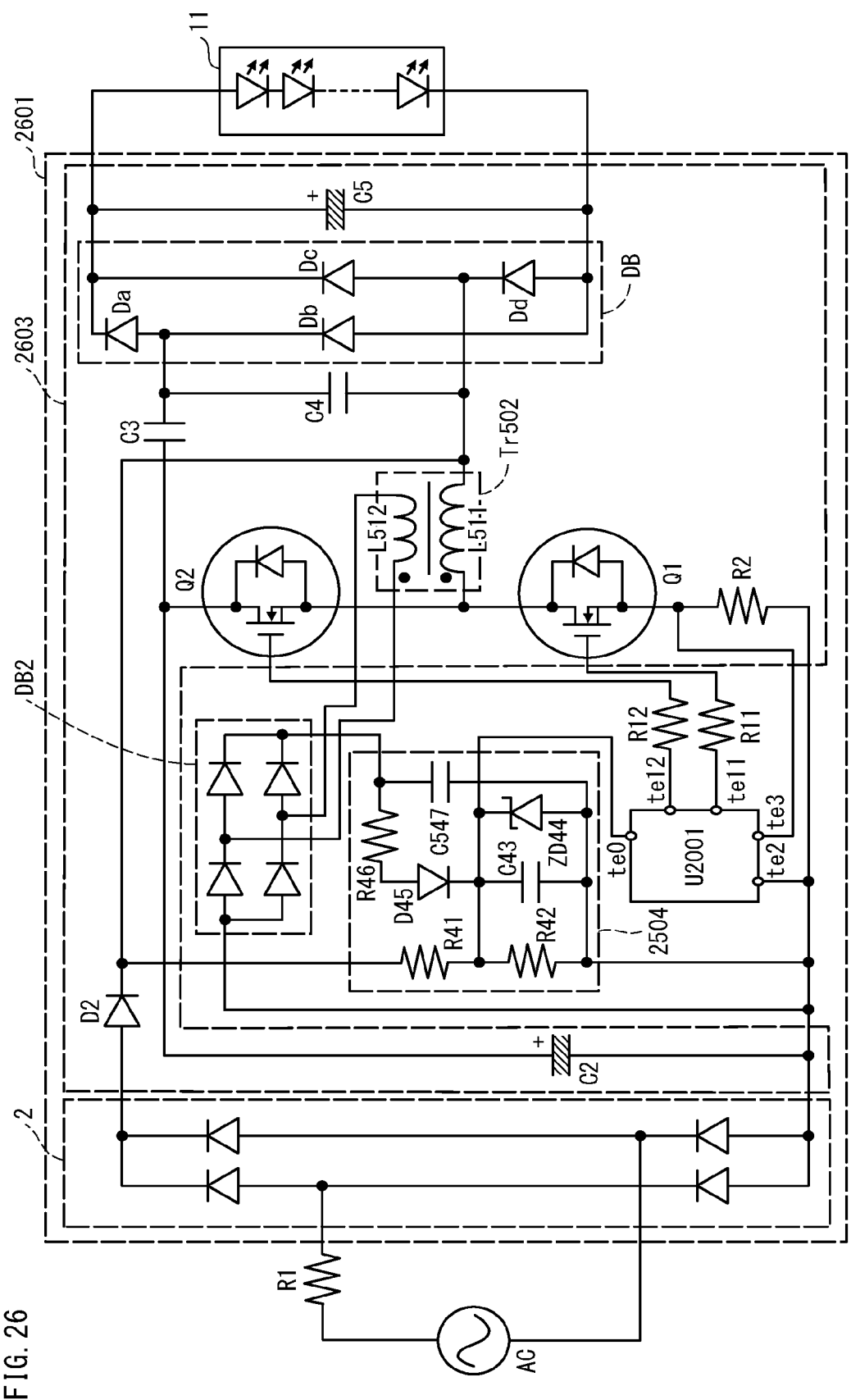
FIG. 26 is a circuit diagram illustrating a DC power supply circuit relating to a modified example.

FIG. 26 is a circuit diagram illustrating a DC power supply circuit 2601 relating to a different modified example. Elements of configuration which are the same as in FIG. 25 are labeled using the same reference signs and explanation thereof is omitted where appropriate.

The DC power supply circuit 2601 differs from the configuration illustrated in FIG. 25 in terms that voltage conversion circuit 2603 includes a diode bridge DB2 which has input terminals connected across the first and second terminals of the secondary coil L512 in the transformer Tr502. An output terminal at a high-potential side of the diode bridge DB2 is connected to the fixed voltage circuit 2504 and an output terminal at a low-potential side of the diode bridge DB2 is connected to the output terminal at the low-potential side of the rectifier circuit 2. Note that in the transformer Tr502, polarity of the primary coil L511 may alternatively be the opposite of polarity of the secondary coil L512.

In the configuration described above, current is supplied from the diode bridge DB2 to the fixed voltage circuit 2504 at the same time as magnetic energy is discharged from the primary coil L511 and also at the same time as magnetic energy is accumulated in the primary coil L511.

Furthermore, in a configuration in which power is supplied from the voltage conversion circuit 2603, power may for example be supplied to the fixed voltage circuit 2504 when voltage at a node between the transformer Tr502 and the switching element Q1 is no greater than a certain voltage during a period in which the switching element Q1 is in the turned-off state.

Figure 27:
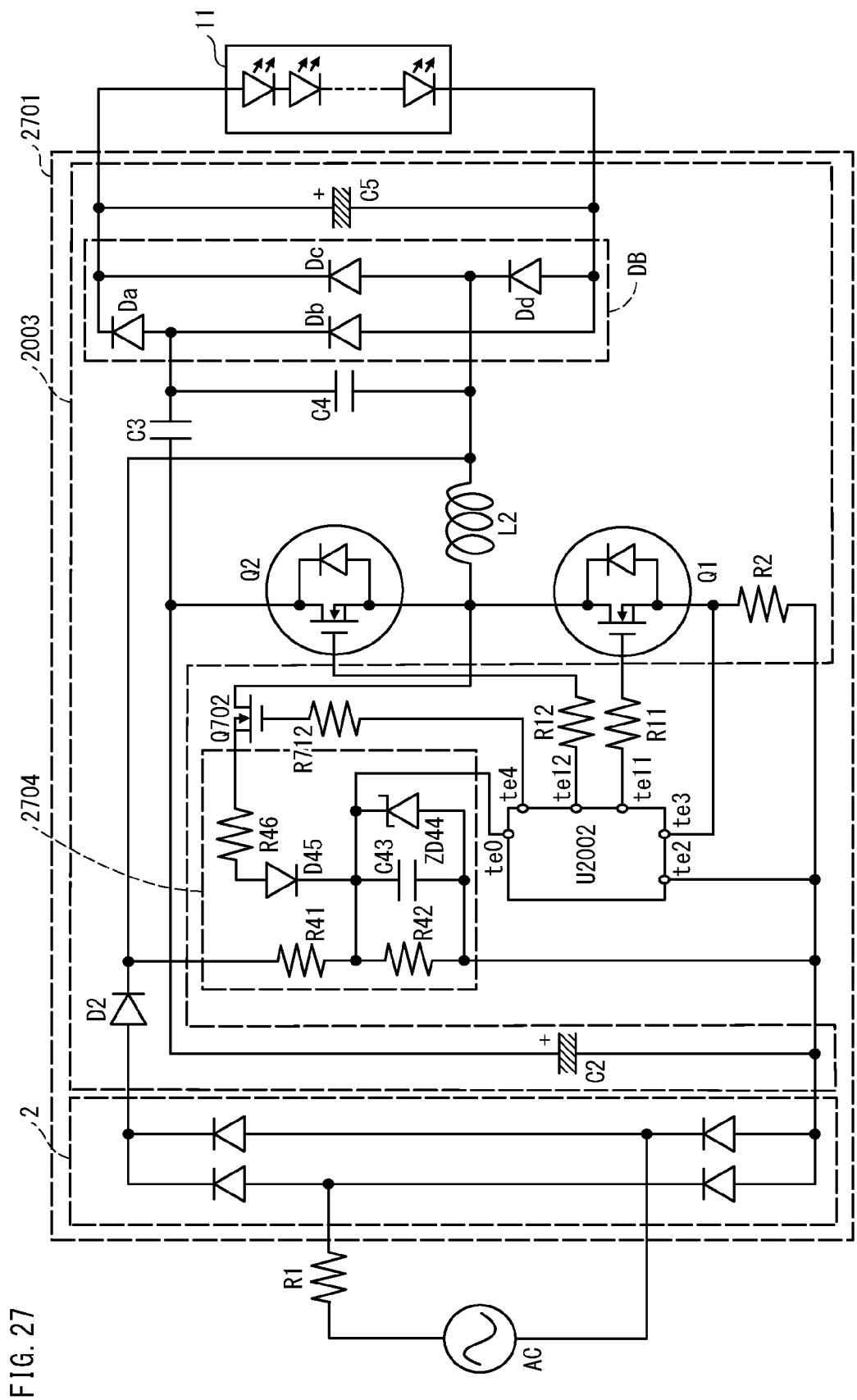
FIG. 27 is a circuit diagram illustrating a DC power supply circuit relating to a modified example.

FIG. 27 is a circuit diagram illustrating a DC power supply circuit 2701 relating to a different modified example. Elements of configuration which are the same as in the embodiments are labeled using the same reference signs and explanation thereof is omitted where appropriate.

In the DC power supply circuit 2701, a switching element Q702 is connected between a fixed voltage circuit 2704 and the node between the inductor L2 and the switching element Q1 in the voltage conversion circuit 2003. Also, the DC power supply circuit 2701 includes a drive circuit U2002, which has a control terminal te4 for outputting a signal voltage for controlling the switching element Q702.

The switching element Q702 is an N-channel MOSFET. A source of the switching element Q702 is connected to the fixed voltage circuit 2704, a gate of the switching element Q702 is connected to the control terminal te4 of the drive circuit U2002, via a resistor R712, and a drain of the switching element Q702 is connected to a node between the switching elements Q1 and Q2. In the fixed voltage circuit 2704, a resistor R46 is directly connected to the source of the switching element Q702. In other words, the fixed voltage circuit 2704 has the same configuration as the fixed voltage circuit 2504 illustrated in FIG. 25 but with the capacitor C547 omitted therefrom.

During a period in which the switching element Q1 is set in the turned-off state through a signal voltage from an output terminal te11 of the drive circuit U2002, which is a certain voltage that is greater than 0 V, when voltage at the node between the inductor L2 and the switching element Q1 is no greater than a certain voltage, the switching element Q702 is set in the turned-on state through a signal voltage from the control terminal te4, which is a certain voltage that is greater than 0 V. Timing at which the switching element Q702 is turned on is set in advance. As a result, power loss in the resistor R46 of the fixed voltage circuit 2704 can be reduced, enabling improved circuit efficiency. Furthermore, a number of circuit elements can be reduced in the fixed voltage circuit 2704, thereby enabling reduction in circuit size.

(9) In the DC power supply circuit 2001 relating to the second embodiment, high frequency current occurring in the voltage conversion circuit 2003 in accompaniment to on-off operation of the switching element Q1, flows from the voltage conversion circuit 2003 to the power supply AC, via the rectifier circuit 2. As a result, high frequency noise and high frequency ripple leak externally from the DC power supply circuit 2001.

Figure 28A:
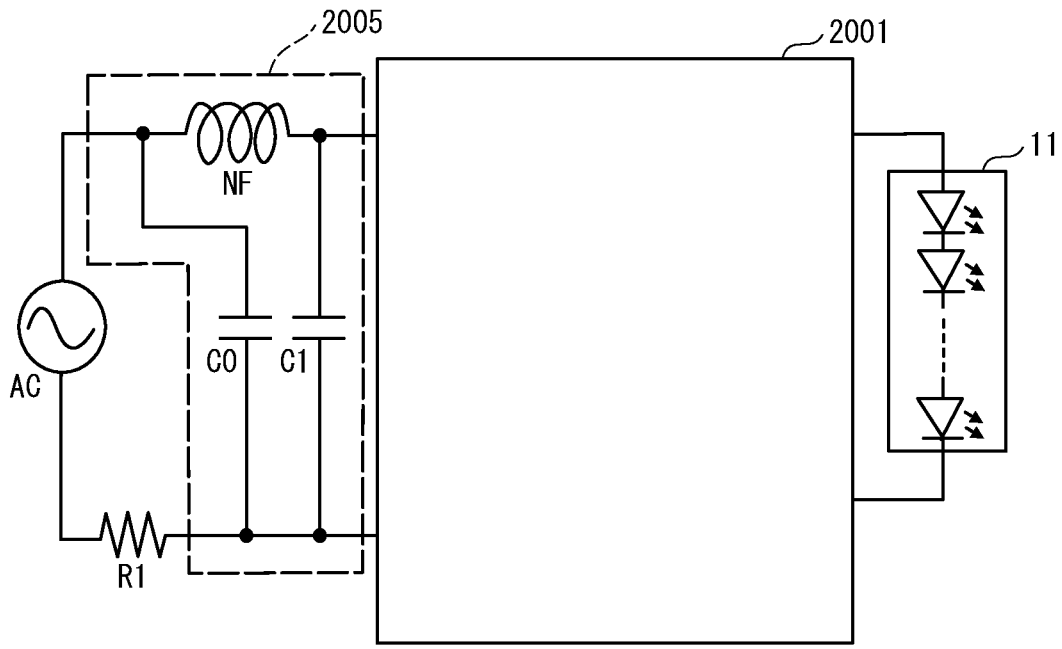
FIG. 28 is a circuit diagram illustrating a DC power supply circuit relating to a modified example.
Figure 28B:
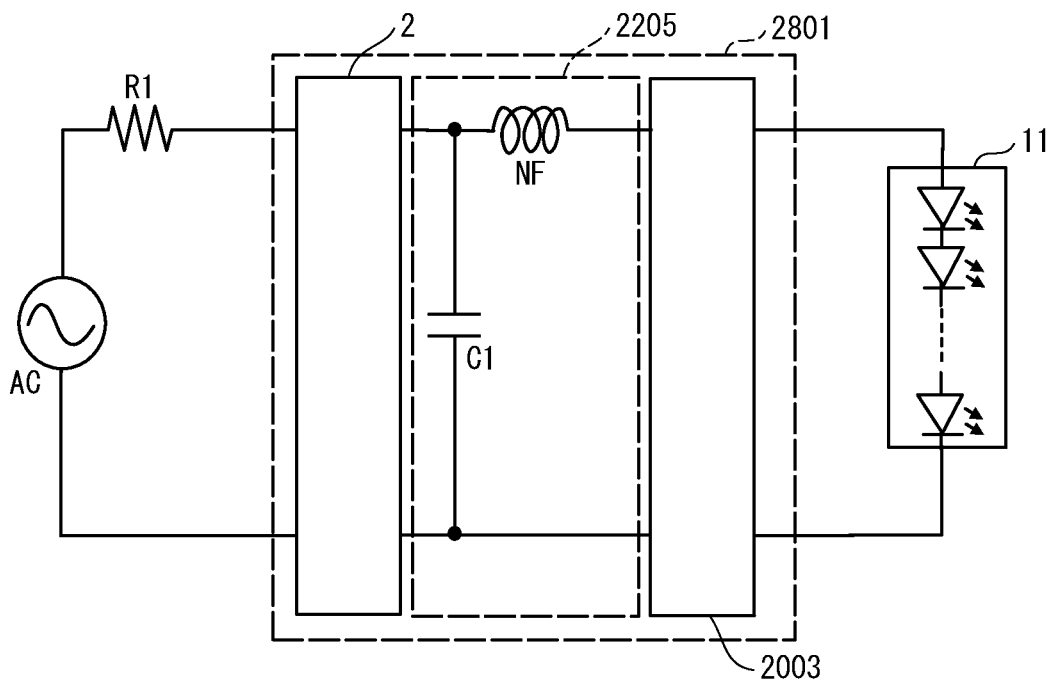

In consideration of the above, a noise filter 2005, including an inductor NF and capacitors C0 and C1, may be provided between the DC power supply circuit 2001 and the power supply AC as illustrated in FIG. 28A. As illustrated in FIG. 28B, alternatively a DC power supply circuit 2801 may include a noise filter 2205 between the rectifier circuit 2 and the voltage conversion circuit 2003. The noise filter 2205 includes a capacitor connected across output terminals of the rectifier circuit 2 and an inductor NF connected in series between the capacitor and the voltage conversion circuit 2003 (i.e., the diode D2 illustrated in FIG. 6). Note that position at which the noise filter is connected is preferably altered in a situation in which an objective is high-frequency ripple reduction compared to a situation in which an objective is high-frequency noise reduction. When high frequency ripple reduction is the objective, in the configuration illustrated in FIG. 28B, preferably the capacitor C1 should be connected to a terminal of inductor NF which is closest to the voltage conversion circuit 2003. Note that in the configuration illustrated in FIG. 28B, alternatively two capacitors may be provided connected to opposite terminals of the inductor NF. Further alternatively, an additional inductor NF may be provided connected to the low-potential side of the rectifier circuit 2.

(10) The second embodiment was explained for an example in which the DC power supply circuit 2001 includes the diode bridge DB as a current supply circuit, but the above is not a limitation. For example, alternatively a current supply circuit may simply be formed by a wire connecting the second terminal of the capacitor C2 and the second terminal of the load 11, and by a wire connecting the second terminal of the inductor L2 and the first terminal of the load 11.

(11) The first embodiment and the second embodiment are explained for examples in which the switching element Q1 in the voltage conversion circuit 3 and the switching elements Q1 and Q2 in the voltage conversion circuit 2003 are N-channel MOSFETs, but the above is not a limitation, and alternatively the aforementioned switching elements may be P-channel MOSFETs. Further alternatively, the aforementioned switching elements may be bipolar transistors.

(12) A configuration may be adopted in which a power adjuster is provided between the power supply AC and the DC power supply circuit 1 in order to adjust power input to the DC power supply circuit 1. Note that likewise, a power adjustor may be provided between the power supply AC and the DC power supply circuit 2001. The power adjustor may typically include a triac or the like, and there is a possibility of a malfunction occurring in the triac if current flows toward the DC power supply circuit 1 while input voltage to the DC power supply circuit 1 is zero.

With respect to the above problem, phase of input voltage approximately matches phase of input current in the DC power supply circuit 1, and input current is caused to flow even at low input voltage close to crossing zero. As a result, power adjustor malfunction is prevented in the configuration described above in which the power adjustor includes the triac.

REFERENCE SIGNS LIST 1, 201, 301, 2001, 2201, 2301, 2401, 2501, 2601, 2701, 2801 DC power supply circuit
2 rectifier circuit
3, 203, 2003, 2203, 2303, 2403, 2503, 2603 voltage conversion circuit
4, 504, 2704 fixed voltage circuit
11, 21 load
2005, 2205 noise filter
C0, C2, C3, C4, C5, C22, C24, C32, C34, C43, C47, C402, C403, C404, C455, C468, C547 capacitor
D1, D2, D3, D21, D31, D45, D48, D201, D311, D312, D453, D460a, D461a, D466a, D466b diode
DB, DB2 diode bridge
L2, L3, L22, L23, L32, L402 inductor L331, L464a, L511 primary coil
L332, L464b, L512 secondary coil
L464c tertiary coil
Q1, Q2, Q401, Q402, Q702 switching element
R1, R2, R11, R12, R41, R42, R46, R452, R465a, R467a, R467b, R712 resistor
T454 triac
TF33, Tr464, Tr502 transformer
U1, U2001, U2002 drive circuit
ZD44 zener diode

The invention claimed is:
1. A DC power supply circuit comprising:
a rectifier circuit configured to rectify AC supplied from an AC power supply; and
a voltage conversion circuit connected across output terminals of the rectifier circuit and configured to convert an input voltage from the rectifier circuit so as to output a converted voltage to a load connected across output terminals of the voltage conversion circuit, wherein
the voltage conversion circuit includes:
a capacitor having a first terminal that is connected to one of the output terminals of the rectifier circuit located at a low-potential side of the rectifier circuit;
a series circuit including an inductor and a switching element, the series circuit being included along a discharge current path for the capacitor, extending from a second terminal of the capacitor to the first terminal of the capacitor; and
a charging current supply path connecting, to the second terminal of the capacitor, a first terminal of the inductor which is connected to the switching element, and supplying current from the inductor to the second terminal of the capacitor,
another of the output terminals of the rectifier circuit located at a high-potential side of the rectifier circuit is connected to a second terminal of the inductor, and
the voltage conversion circuit causes a first period and a second period to be alternately repeated a plurality of times during each half cycle of the AC through on-off operation of the switching element,
the first period being a period during which current flows along a first current path extending from the output terminal at the high-potential side of the rectifier circuit to the output terminal at the low-potential side of the rectifier circuit, via the inductor and the switching element, and
the second period being a period during which current flows along a second current path extending from the output terminal at the high-potential side of the rectifier circuit to the output terminal at the low-potential side of the rectifier circuit, via the inductor, the charging current supply path, and the capacitor.
2. The DC power supply circuit of claim 1, wherein
the voltage conversion circuit further includes an auxiliary inductor located along the current discharge path between the second terminal of the capacitor and the series circuit, and connected in series to the inductor,
the output terminal at the high-potential side of the rectifier circuit is connected to the inductor via a node between the inductor and the auxiliary inductor,
the first current path and the second current path each extend from the output terminal at the high-potential side of the rectifier circuit to the inductor via the node,
during the first period, simultaneously to current flowing along the first current path, electrical charge of the capacitor is discharged along the discharge current path, causing energy accumulation in the inductor and the auxiliary inductor, and
during the second period, simultaneously to current flowing along the second current path, energy accumulated in the inductor and the auxiliary inductor is discharged toward the capacitor along the charging current supply path, causing charging of the capacitor.
3. The DC power supply circuit of claim 2, wherein
the auxiliary inductor has a first terminal that is connected to the second terminal of the capacitor via the load, and
the charging current supply path includes a diode having an anode that is connected to the first terminal of the inductor and a cathode that is connected to the second terminal of the capacitor.
4. The DC power supply circuit of claim 2, wherein
the current discharge path includes:
the switching element;
the inductor having the first terminal that is connected to the switching element; and
the auxiliary inductor having a first terminal that is connected to the second terminal of the capacitor and a first terminal of the load, and a second terminal that is connected to the second terminal of the inductor, and
the charging current supply path includes a diode having an anode that is connected to the first terminal of the inductor and a cathode that is connected to a second terminal of the load.
5. The DC power supply circuit of claim 1, wherein
the inductor has a center tap, via which the output terminal at the high-potential side of the rectifier circuit is connected to the inductor,
the first current path and the second current path each extend from the output terminal at the high-potential side of the rectifier circuit to the inductor via the center tap,
during the first period, simultaneously to current flowing along the first current path, electrical charge of the capacitor is discharged along the discharge current path, causing energy accumulation in the inductor,
during the second period, simultaneously to current flowing along the second current path, energy accumulated in the inductor is discharged toward the capacitor along the charging current supply path, causing charging of the capacitor, and
magnitude of current flowing along the first current path and the second current path is adjusted through adjustment of position of the center tap in the inductor.
6. The DC power supply circuit of claim 1, wherein
the charging current supply path includes an auxiliary switching element that is connected between the first terminal of the inductor and the second terminal of the capacitor,
the discharge current path includes:
a resonance capacitor having a first terminal that is connected to the second terminal of the capacitor; and
a current supply circuit that is connected between the second terminal of the inductor and a second terminal of the resonance capacitor, and that supplies current to the load,
the output terminal at the high-potential side of the rectifier circuit is connected to a node between the second terminal of the inductor and the current supply circuit,
the auxiliary switching element operates such as to be in a turned-off state during the first period and a turned-on state during the second period, the second current path extends from the inductor to the capacitor via the auxiliary switching element, during the first period, simultaneously to current flowing along the first current path causing magnetic energy accumulation in the inductor, electrical charge accumulated in the capacitor is discharged to the load, via the resonance capacitor and the current supply circuit, and during the second period, simultaneously to current flowing along the second current path causing charging of the capacitor, magnetic energy accumulated in the inductor is discharged along an energy discharge path to the load, via the auxiliary switching element, the resonance capacitor, and the current supply circuit.

7. The DC power supply circuit of claim 6, wherein the current supply circuit is a diode bridge having a first input terminal connected to the second terminal of the resonance capacitor, a second input terminal connected to the second terminal of the inductor, and two output terminals across which the load is connected, the discharge current path extends from the second terminal of the capacitor to the first terminal of the capacitor, via the resonance capacitor, the first input terminal of the current supply circuit, the load, the second input terminal of the current supply circuit, and the switching element in respective order, and the energy discharge path extends from the first terminal of the inductor to the second terminal of the inductor, via the switching element, the resonance capacitor, the first input terminal of the current supply circuit, the load, and the second input terminal of the current supply circuit in respective order.

8. The DC power supply circuit of claim 6, wherein the current supply circuit includes a diode having an anode that is connected to the second terminal of the resonance capacitor and a cathode that is connected to the second terminal of the inductor via the load.

9. The DC power supply circuit of claim 6, wherein the load includes a first load and a second load, and the current supply circuit includes:
    a first diode having an anode that is connected to the second terminal of the resonance capacitor and a cathode that is connected to the second terminal of the inductor via the first load; and
    a second diode having an anode that is connected to the second terminal of the inductor via the second load and a cathode that is connected to the second terminal of the resonance capacitor.

10. The DC power supply circuit of claim 6, wherein the voltage conversion circuit further includes:

a first unidirectional element connected in parallel to the switching element; and a second unidirectional element connected in parallel to the auxiliary switching element.

11. The DC power supply circuit of claim 10, wherein the switching element and the auxiliary switching element are each a field effect transistor, the first unidirectional element is a diode having an anode that is connected to a source of the switching element and a cathode that is connected to a drain of the switching element, and the second unidirectional element is a diode having an anode that is connected to a source of the auxiliary switching element and a cathode that is connected to a drain of the auxiliary switching element.

12. The DC power supply circuit of claim 10, wherein during transition from the first period to the second period and during transition from the second period to the first period, a period occurs during which the switching element and the auxiliary switching element are both maintained in a turned-off state.

* * * * *